(12) United States Patent
Tseng et al.

(10) Patent No.: US 10,920,988 B2
(45) Date of Patent: Feb. 16, 2021

(54) KILN

(71) Applicants: NATIONAL CHUNG-SHAN INSTITUTE OF SCIENCE & TECHNOLOGY, Taoyuan (TW); TEN WING SCIENTIFIC CO., LTD., Taichung (TW)

(72) Inventors: Hsi-Ming Tseng, Taoyuan (TW); Li-Chih Liao, Taichung (TW)

(73) Assignees: National Chung-Shan Institute of Technology & Science, Taoyuan (TW); Ten Wing Scientific CO., LTD, Taichung (TW)

( * ) Notice: Subject to any disclaimer, the term of this patent is extended or adjusted under 35 U.S.C. 154(b) by 198 days.

(21) Appl. No.: 16/121,499

(22) Filed: Sep. 4, 2018

(65) Prior Publication Data

US 2019/0195500 A1    Jun. 27, 2019

(30) Foreign Application Priority Data

Dec. 27, 2017 (TW) .................................. 106145851

(51) Int. Cl.
*F24C 3/00* (2006.01)
*F24C 3/02* (2006.01)
(Continued)

(52) U.S. Cl.
CPC ................ *F24C 3/025* (2013.01); *A21B 1/02* (2013.01); *A21B 1/28* (2013.01); *F24B 1/24* (2013.01); *F24C 3/082* (2013.01); *F24C 15/30* (2013.01)

(58) Field of Classification Search
CPC .......... F24C 3/025; F24C 15/32; F24C 15/30; F24C 3/004; F24C 3/042; F24C 3/045;
(Continued)

(56) References Cited

U.S. PATENT DOCUMENTS 2,806,463 A * 9/1957 Smith ................. A47J 37/0704
126/25 A
4,598,691 A * 7/1986 Herrelko ............. F24C 15/2007
126/19 R
(Continued)

FOREIGN PATENT DOCUMENTS

JP        2006280377 A    10/2006
TW         M538324 U      3/2017
(Continued)

OTHER PUBLICATIONS

Examination and Search Report for TW106145851, dated Sep. 18, 2018, Total of 5 pages.
(Continued)

*Primary Examiner* — Alfred Basichas
(74) *Attorney, Agent, or Firm* — Tracy M Helms; Apex Jurls, pllc.

(57) ABSTRACT

A kiln including a stove and a heat source wherein the stove includes a cavity, an entry, and an air outlet. The cavity includes a front section communicating with the entry, a rear section disposed away from the entry, and a middle section disposed between the front section and the rear section. A top wall surface of the front section tilts downwardly toward the entry, and a top wall surface of the rear section tilts downwardly from the middle section toward a direction away from the entry. The air outlet is located between a top of the front section and the entry. The heat source is disposed in the rear section and includes a heating assembly for generating heat. The heating assembly is located at a position higher than a half of a distance between a top and a bottom of the middle section of the cavity.

13 Claims, 16 Drawing Sheets

(51) Int. Cl.
   *F24B 1/24*   (2006.01)
   *A21B 1/02*   (2006.01)
   *A21B 1/28*   (2006.01)
   *F24C 3/08*   (2006.01)
   *F24C 15/30*  (2006.01)

(58) Field of Classification Search
   CPC ........ F24C 3/082; F24C 15/2007; F27D 7/00; F27D 2001/0073; F24B 1/1957; F24B 1/19; F24B 1/24; F24B 1/02; A21B 1/28; A21B 1/02
   See application file for complete search history.

(56) References Cited

U.S. PATENT DOCUMENTS 5,605,092 A    2/1997  Riccio
   6,745,758 B1   6/2004  Minidis

FOREIGN PATENT DOCUMENTS

TW    M543657 U      6/2017
   WO    2013079985 A1  6/2013

OTHER PUBLICATIONS

Extended European Search Report for EP18215175.3, dated May 9, 2019, Total of 9 pages.
English Abstract for JP2006280377, Total of 1 page.
English Abstract for TWM538324, Total of 1 page.
English Abstract for TWM543657, Total of 1 page.

\* cited by examiner

KILN

BACKGROUND OF THE INVENTION

1. Technical Field

The present invention is related to a heating apparatus, and more particularly to a kiln which burns gas to generate heat.

2. Description of Related Art

Conventional kilns are adapted for cooking food, such as baking pizza, roasting chicken, stewing vegetables, etc. The stove of conventional kilns is usually built by stacking stone material, and an entry is formed at the front side of the stove to communicate with an inside of the cavity. During the stove is in use, wood is added into the cavity from the entry and then the wood is burned to heat the cavity. When the cavity is heated to a temperature suitable for baking food, food ingredients are placed into the cavity from the entry so as to cook the food.

For the conventional kilns, the wood could be arbitrarily placed into the cavity without a fixed position and it usually depends on personal experiences to decide how to place the wood into the cavity. For the users who are lack of experiences, the wood is usually placed into the cavity randomly, which results in a decrease in heating efficiency. Since it could not effectively utilize the circulation of the hot air flow to improve the heating efficiency, part of the energy source would be wasted by the kiln.

Therefore, there remains a persisting need to provide an improvement on the design of the conventional kilns so as to overcome the aforementioned drawbacks.

BRIEF SUMMARY OF THE INVENTION

In view of the above, an object of the present invention is to provide a kiln having a good heating efficiency.

The present invention provides a kiln which includes a stove and a heat source wherein, the stove includes a cavity, an entry, and an air outlet. The cavity includes a front section, a middle section, and a rear section, wherein the front section communicates with the entry; the middle section is disposed between the front section and the rear section; the rear section is away from the entry. A top wall surface of the front section tilts downwardly toward the entry, and a top wall surface of the rear section tilts downwardly from the middle section toward a direction away from the entry. The air outlet is located between a top of the front section and the entry. The heat source is disposed in the rear section of the cavity and including a heating assembly adapted to generate heat for heating the cavity, wherein the heating assembly is located at a position which is higher than a half of a distance between a top and a bottom of the middle section of the cavity.

The advantage of the present invention is that by creating a high-temperature zone at a higher position and utilizing the top wall surface of the cavity, the hot air flow formed by the heat generated from the heating assembly could be guided downwardly by the top wall surface of the front section of the cavity to flow back to the heat source, and the heat dissipation could be minimized and the heating efficiency could be improved as well. Meanwhile, by heating the food ingredients from top down, surfaces of the food ingredients could be heated uniformly.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
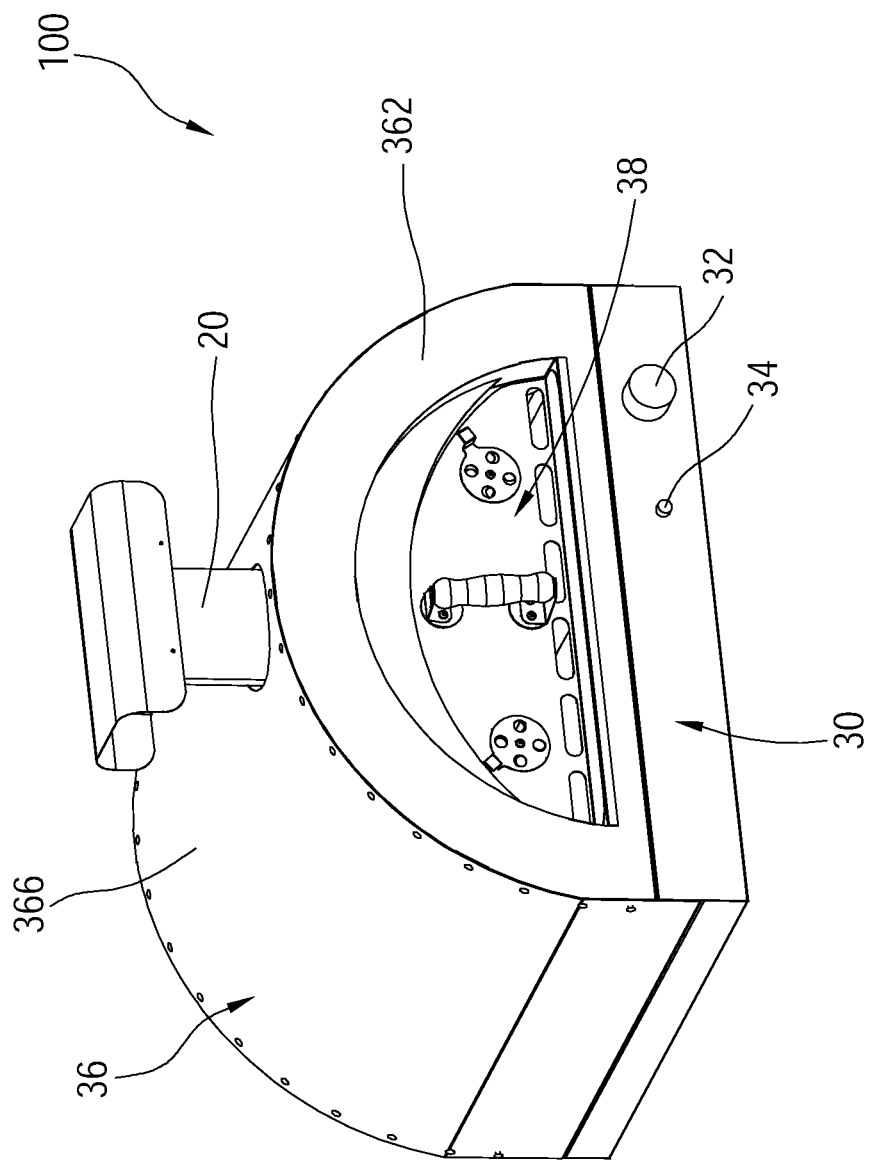
FIG. 1 is a perspective view of a kiln of a first embodiment according to the present invention.
Figure 2:
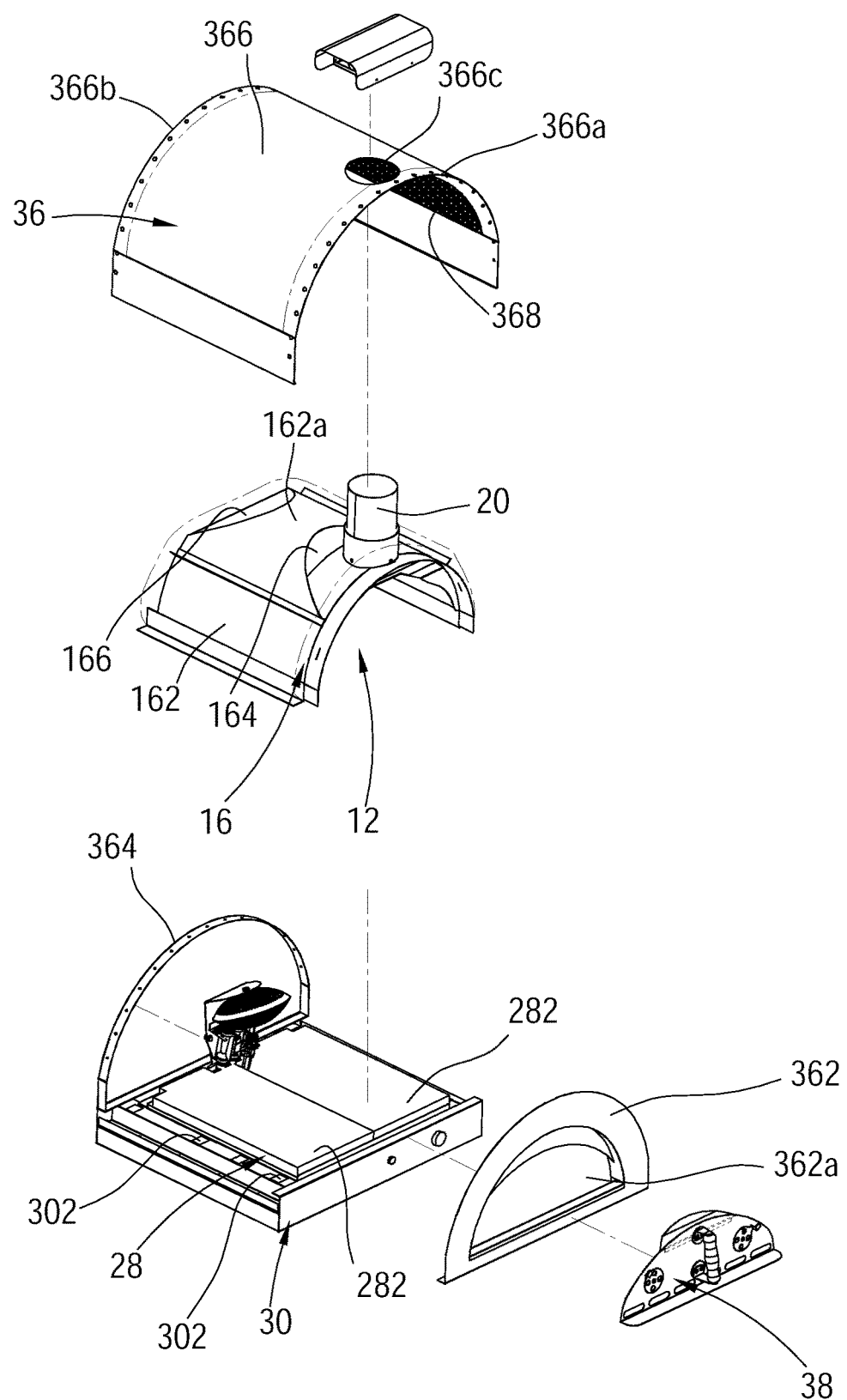
FIG. 2 is an exploded view of the kiln of the first embodiment.
Figure 3:
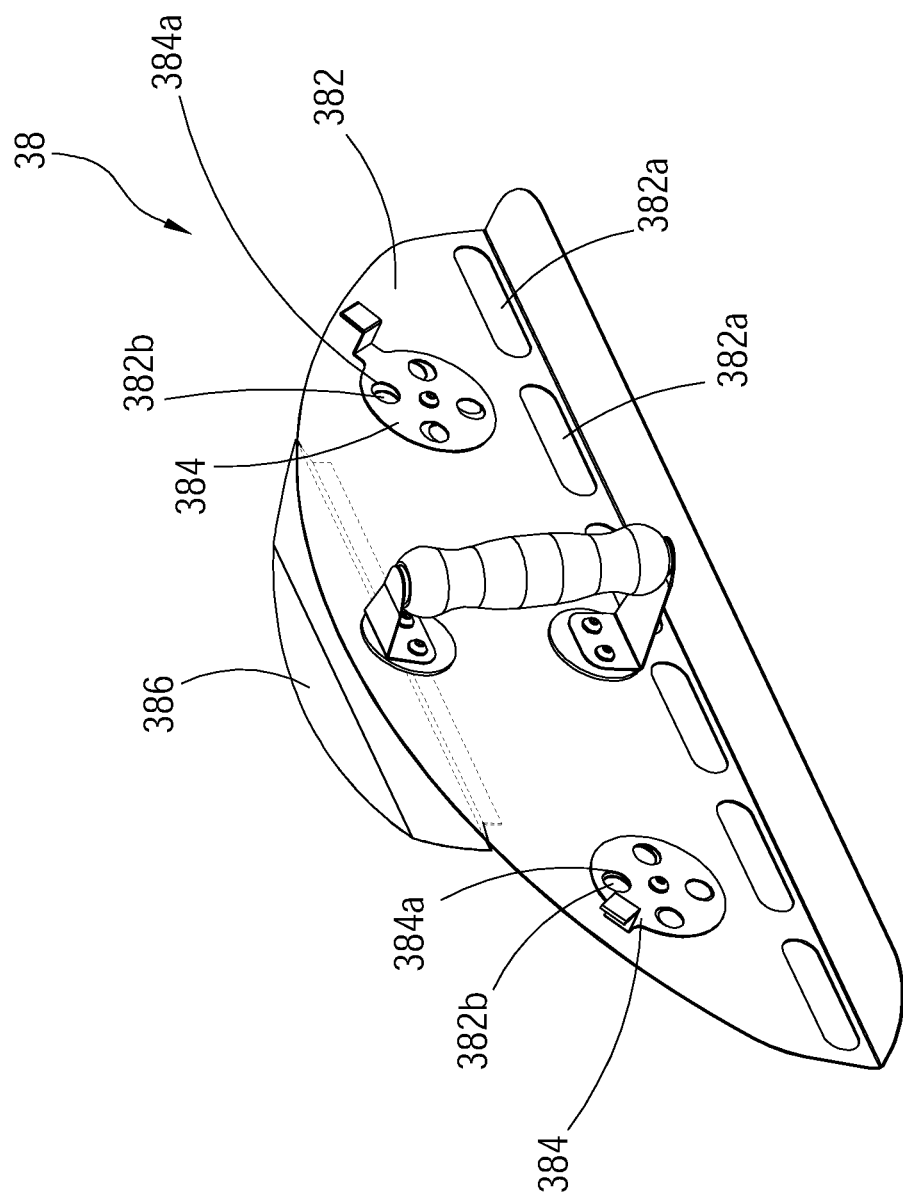
FIG. 3 is a perspective view of the door of the first embodiment.
Figure 4:
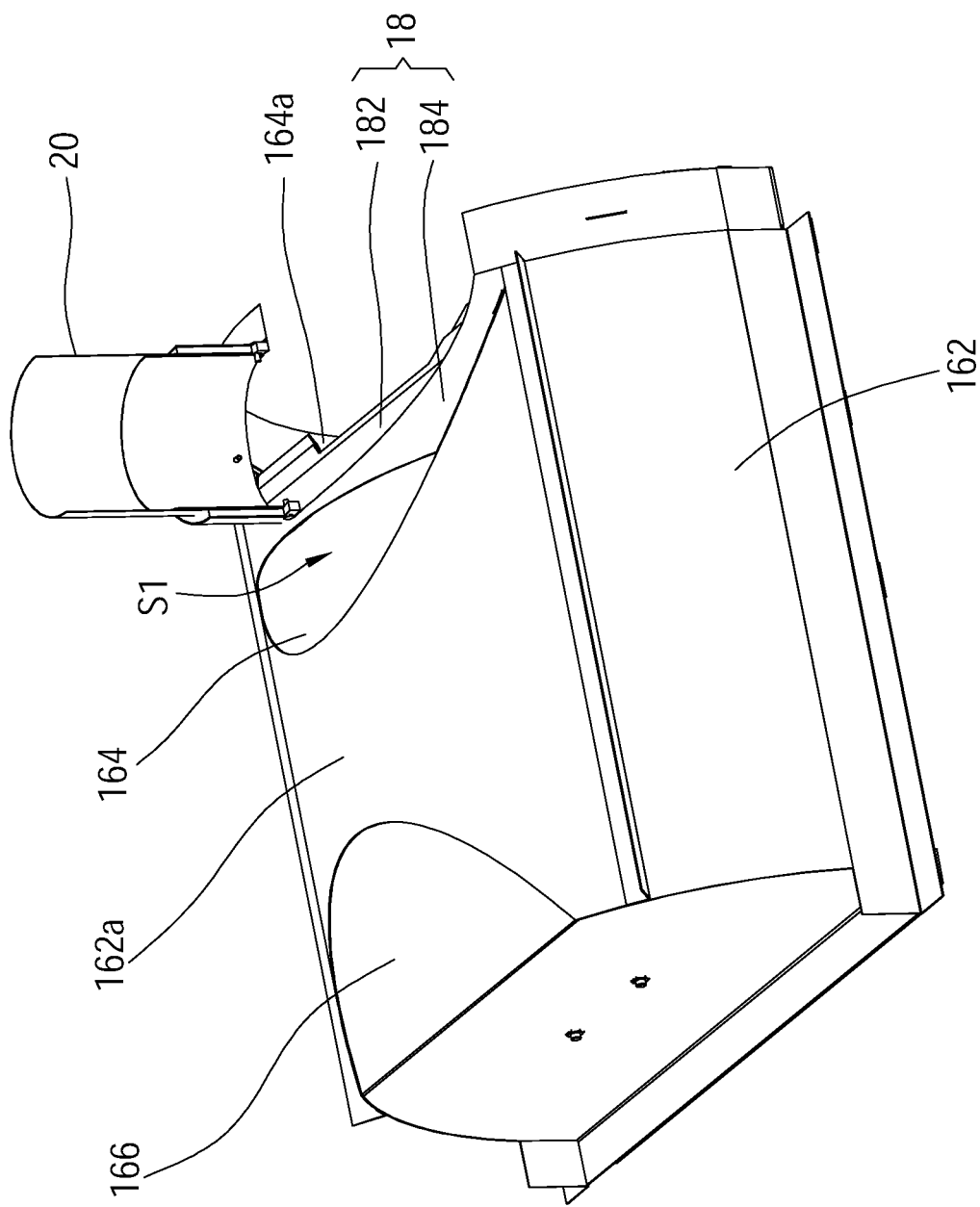
FIG. 4 is a perspective view of the cavity of the first embodiment.

The following illustrative embodiments and drawings are provided to illustrate the present invention and its advantages and effects so it can be clearly understood by persons skilled in the art after reading the disclosure of this specification.

As illustrated in FIG. 1 to FIG. 10, a kiln 100 of a first embodiment according to the present invention includes a stove 10, a housing 36, a door 38, and a heat source which is a combustion device 40 as an example.

Figure 5:
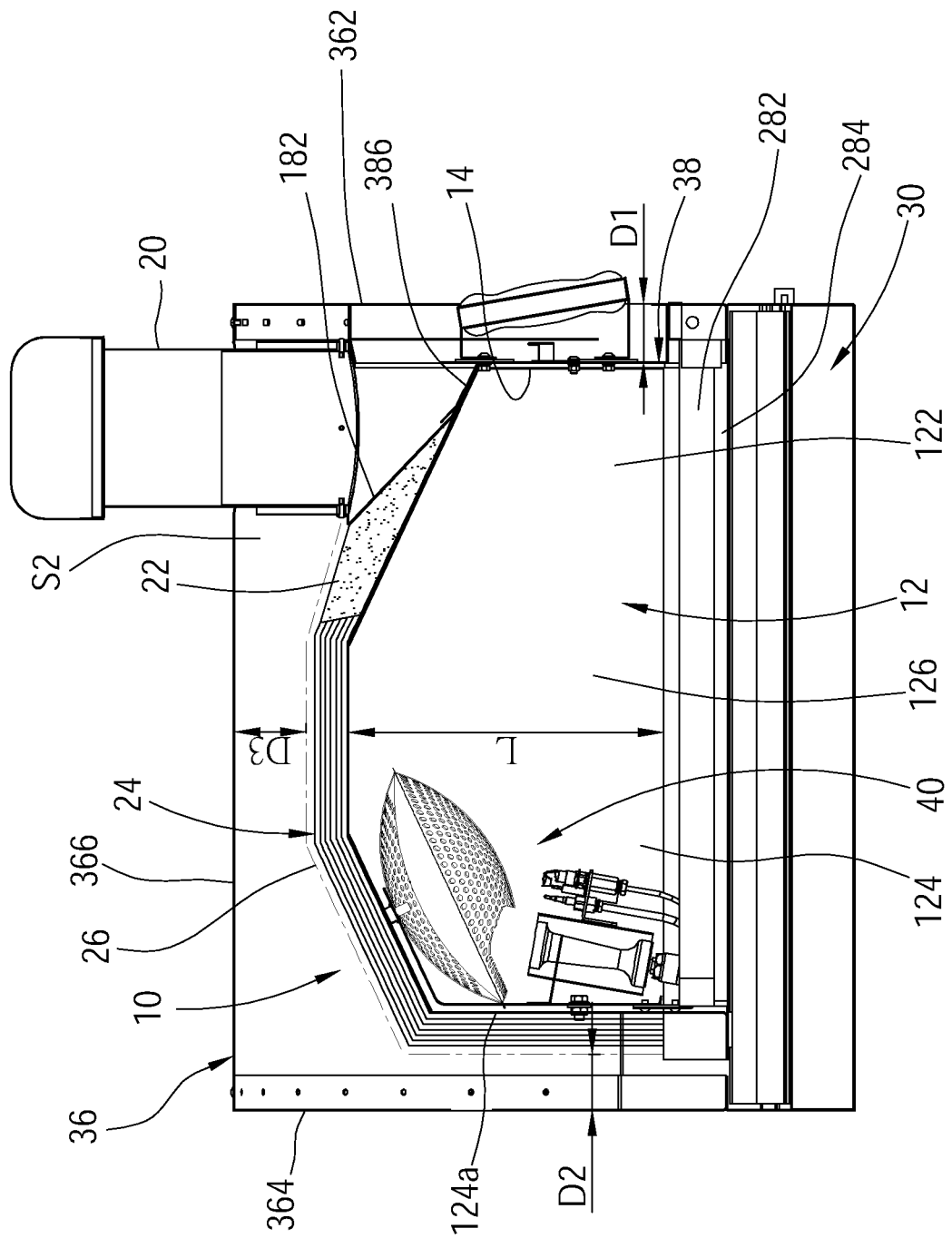
FIG. 5 is a cross-sectional view of the kiln of the first embodiment.

The stove 10 includes a cavity 12 and an entry 14. The cavity 12 includes a front section 122 and a rear section 124. The front section 122 communicates with the entry 14, and a top wall surface at the front section 122 tilts toward the entry 14 downwardly. The rear section 124 is away from the entry 14. An inner wall surface 124a is located at the rear section 124 and faces the entry 14. A top wall surface at the rear section 124 tilts upwardly in a direction away from the inner wall surface 124a. The cavity 12 further includes a middle section 126 which is located between the front section 122 and the rear section 124. A top wall surface at the middle section 126 is higher than those of the front section 122 and the rear section 124, wherein a maximum distance L between the top wall surface and a bottom of the middle section 126 along a direction from the front section 122 to the rear section 124 remains the same (as shown in FIG. 5). That is, the maximum distance L between the between the top wall surface and the bottom of the middle section 126 remains as a constant in the middle section. The top wall surface at the rear section 124 tilts downwardly from the middle section toward a direction away from the entry 14.

In the current embodiment, the stove 10 includes a chamber 16, an air guide structure 18, a heat storage member 22, a thermal insulation member 24, and a base 28. Wherein, the chamber 16 is a substantially arch shape and made of metal such as stainless steel. A front end of the chamber 16 is open, and the entry 14 is formed at the front end of the chamber 16. A rear end of the chamber 16 is closed, and includes the inner wall surface 124a. The cavity 12 is within the chamber 16. The chamber 16 is disposed on the base 28, wherein the chamber 16 includes a main body 162, a first inclined plate 164 and a second inclined plate 166. A middle part 162a is formed on a top of the main body 162, wherein the first inclined plate 164 and the second inclined plate 166 are joined to a front end and a rear end of the middle part 162a respectively. The first inclined plate 164 is corresponding to the front section 122 of the cavity 12, the middle part 162a is corresponding to the middle section 126 of the cavity 12, and the second inclined plate 166 is corresponding to the rear section 124 of the cavity 12. An inner surface of the first inclined surface 164 constitutes the top wall surface of the front section 122, while an inner surface of the second inclined plate 166 constitutes the top wall surface of the rear section 124.

An air outlet 164a is formed on the first inclined plate 164 of the chamber 16, wherein the air outlet 164a communicates with the entry 14 and is disposed between the top of the front section 122 of the cavity and the entry 14. The air guide structure 18 is disposed in the chamber and located at the top of the front section 122 of the cavity 12, wherein the air guide structure 18 communicates with the air outlet 164a. In the current embodiment, the air guide structure 18 includes a guide plate 182 and a lid plate 184. The guide plate 182 is joined to the first inclined plate 164, wherein an angle between the guide plate 182 and the first inclined plate 164 is smaller than 90 degrees. The lid plate 184 is an arch shape, wherein two sides of the lid plate 184 are joined to the chamber 16, and an inner surface of the lid plate 184 is joined to a peripheral edge of the guide plate 182. A space S1 is enclosed by the lid plate 184, the guide plate 182, and the first inclined plate 164. The space S1 is adapted to receive the heat storage member 22. An exhaust pipe 20 is joined to the lid plate 184 and disposed above the air guide structure 18. The guide plate 182 tilts upwardly from the air outlet 164a toward a direction away from the entry 14. Whereby, an exhaust channel E is formed by the guide plate 182 of the air guide structure 19 and the exhaust pipe 20. The heat storage member 22 covers the first inclined plate 164, i.e., the heat storage member 22 is disposed at an exterior of the chamber 16 at the top of the front section 122 of the cavity 12, and at least part of the heat storage member 22 is located in the space S1 and contacts the air guide structure 18. In the current embodiment, part of the heat storage member 22 is located in the space S1, while another part of the heat storage member 22 protrudes out of the space S1, and the air guide structure 19 contacts an exterior surface of the guide plate 182. Preferably, a thermal conductivity of the heat storage member 22 is equal to or greater than 0.7 W/(mK), and a heat storage density thereof is equal to or greater than 1 KJ/m³K. In the current embodiment, the thermal conductivity of the heat storage member 22 is 0.8-0.93 W/(mK), and the heat storage density thereof is 1.4 KJ/m³K. The heat storage member 22 includes a plurality of stacked particles (e.g. sands, or pebbles), and the air fills the gaps between the stacked particles. By enclosing within the space S1, the particles could be prevented from sliding down.

Figure 6:
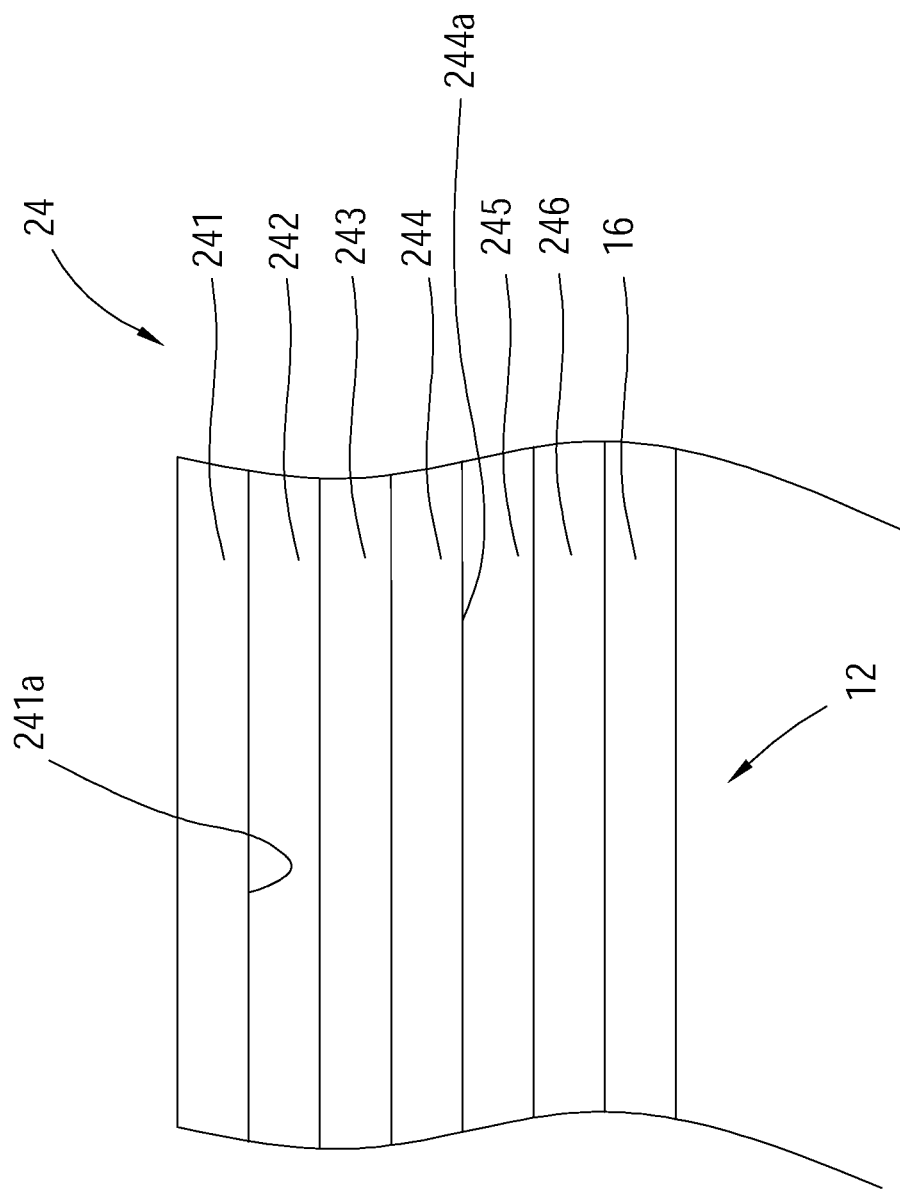
FIG. 6 is a schematic view of the thermal insulation structure of the first embodiment.
Figure 7:
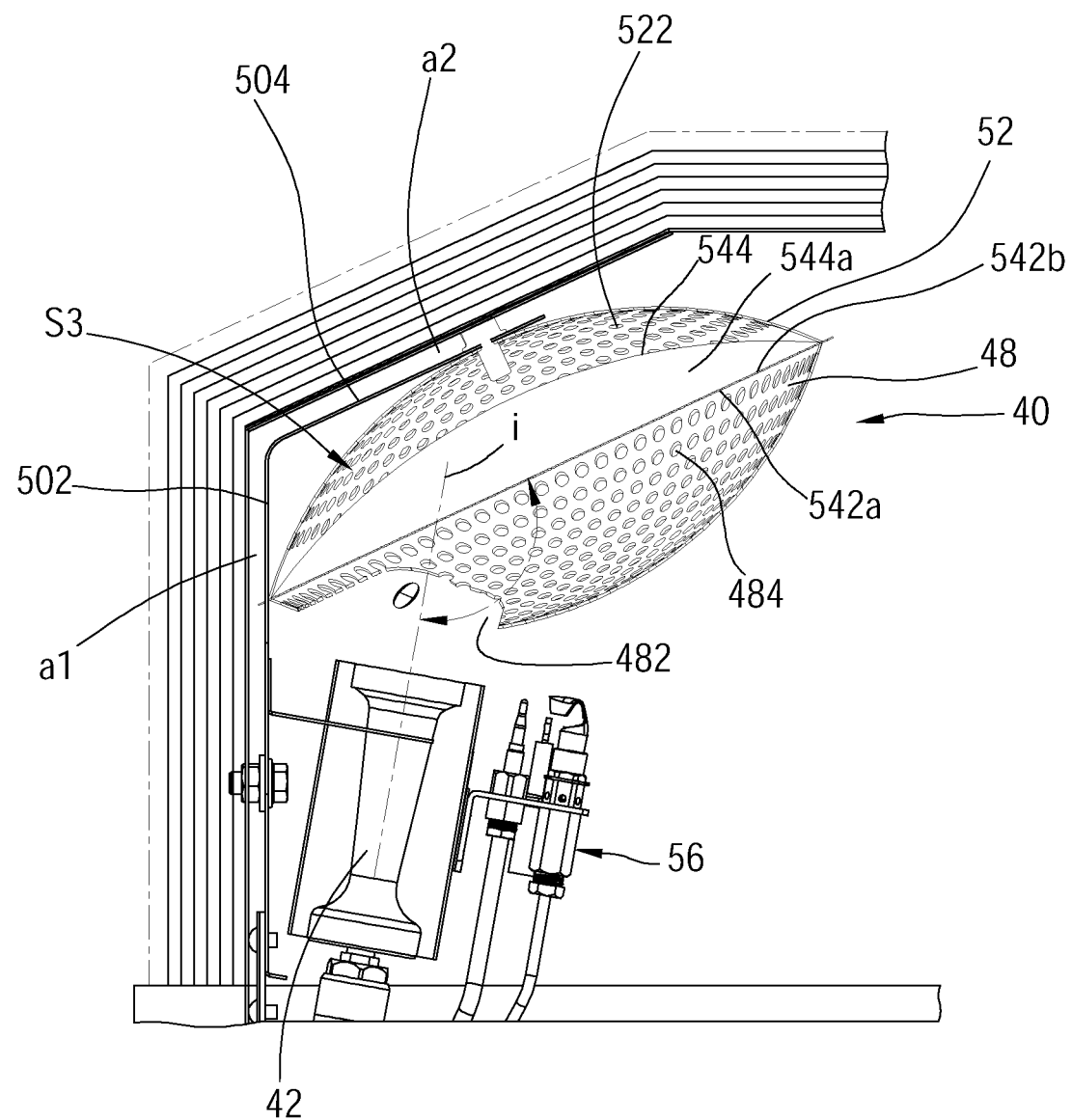
FIG. 7 is a partial cross-sectional view of the kiln of first the embodiment.
Figure 8:
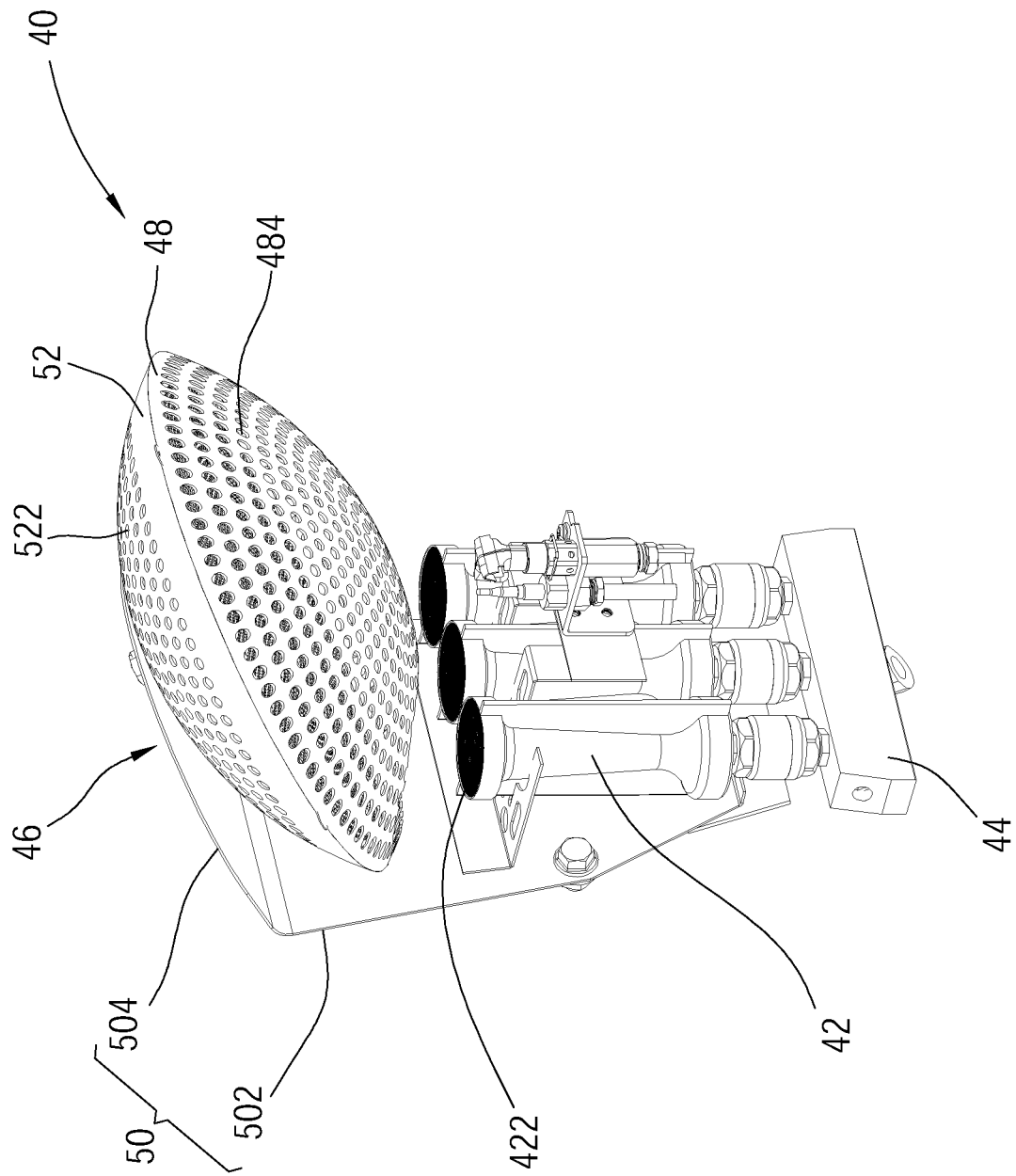
FIG. 8 is a perspective view of the combustion device of the first embodiment.
Figure 9:
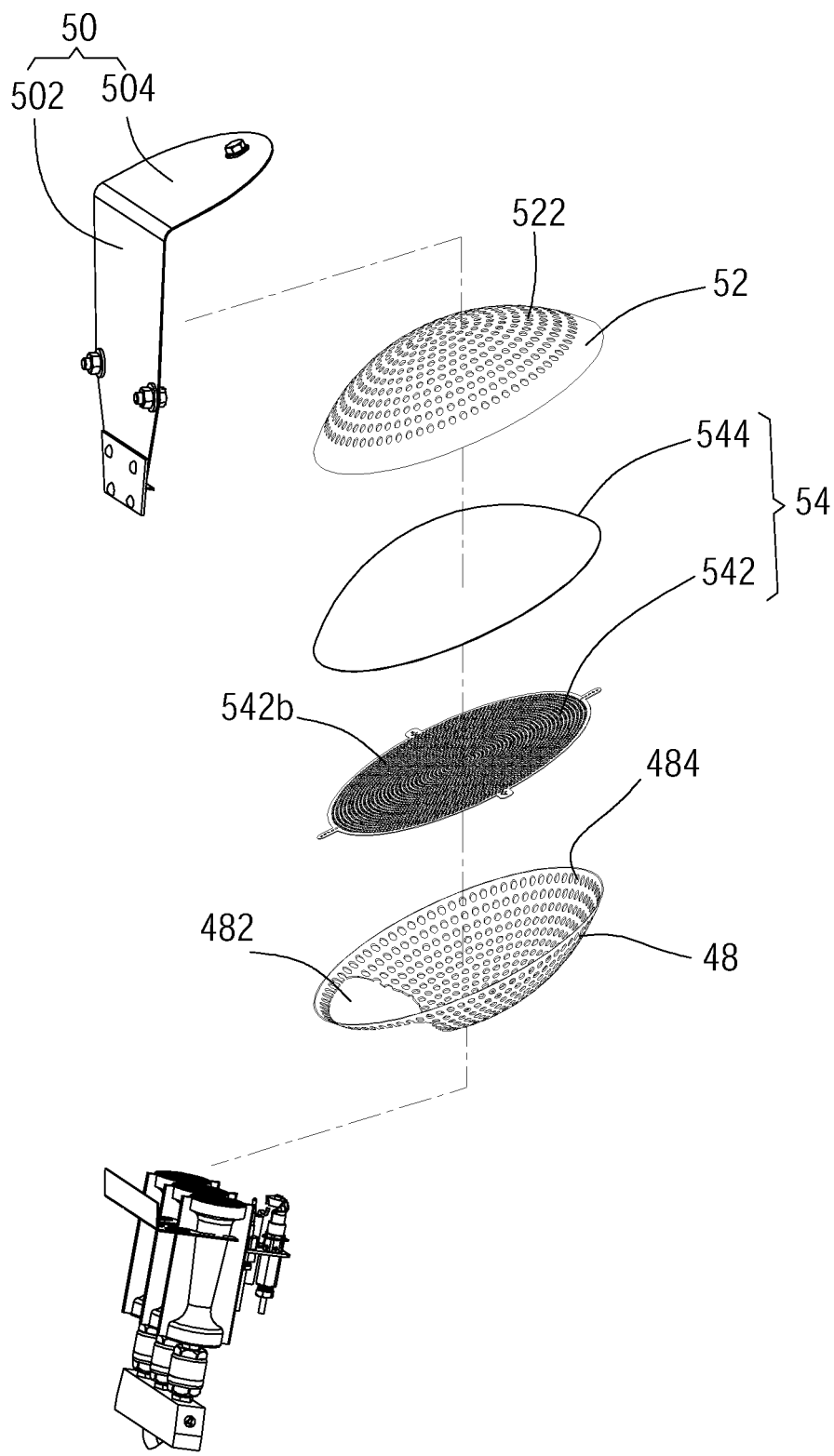
FIG. 9 is an exploded view of the combustion device of the first embodiment.
Figure 10:
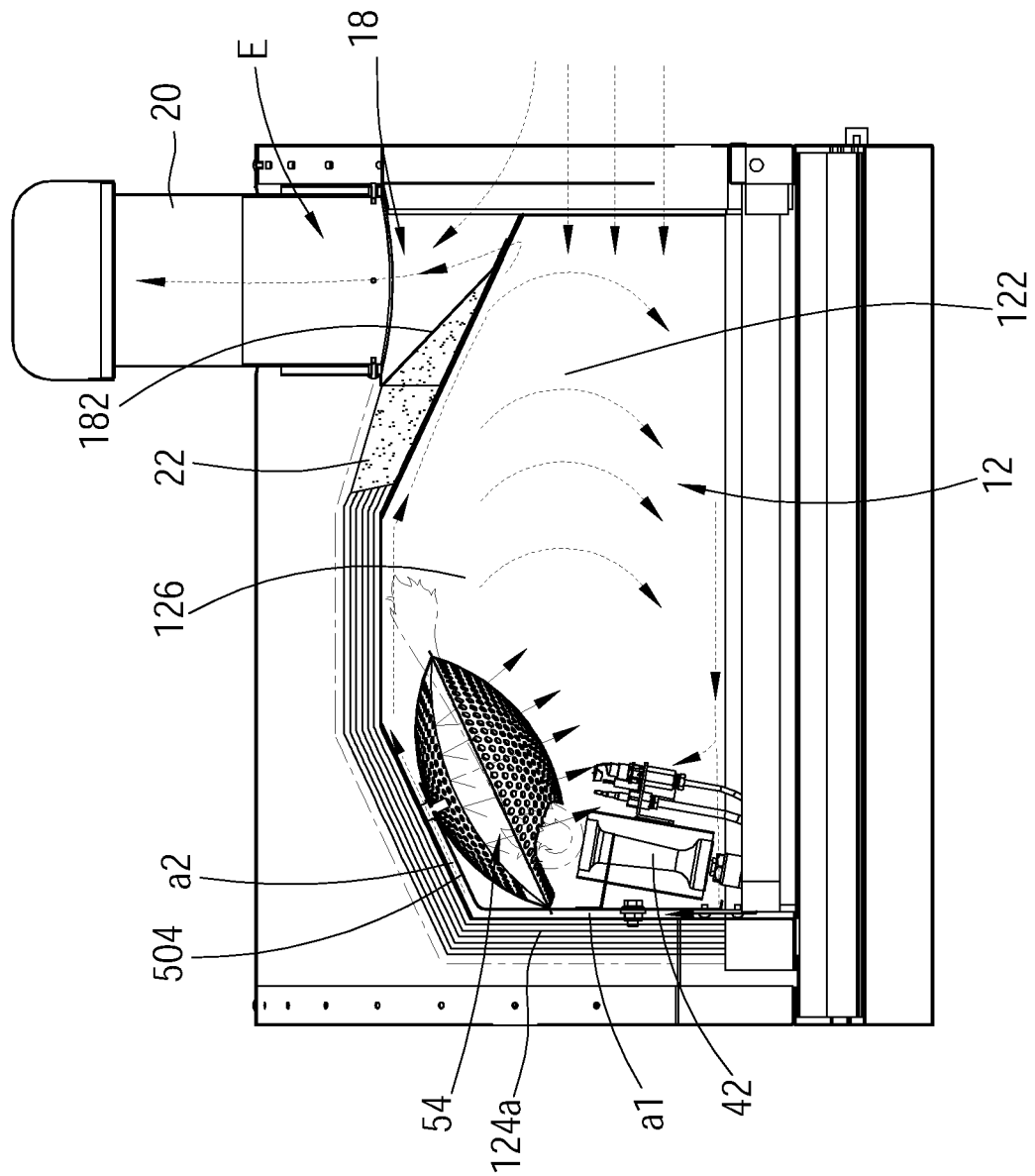
FIG. 10 is a schematic view showing that inside of the cavity of the kiln as illustrated in FIG. 1 is being heated.

In addition, the thermal insulation structure 24 covers the exterior of the chamber 16 which is corresponding to the rear section 124 and the middle section 126, and is disposed at an outer peripheral of the heat storage member 22. A heat insulation effect of the thermal insulation structure 24 is better than that of the heat storage member 22, whereby a temperature at the middle section 126 of the cavity 12 is higher than that of the front section 122 so as to increase heat convection. In practice, the heat storage member 22 also could be omitted, and part of the thermal insulation structure 24 could extend to a position where the heat storage member 22 locates. As illustrated in FIG. 6, the thermal insulation structure 24 includes, from outward to inward, a first reflection layer 241, a barrier layer 242, a thermal insulation layer 243, a second reflection layer 244, a heat storage layer 245, and a heat conduction layer 246.

The thermal conductivity of the heat conduction layer 246 is greater than that of the heat storage layer 245. The heat conduction layer 246 is adapted to absorb part of heat from the chamber 16 rapidly and transfer the heat to the heat storage layer 245, whereby the heat could be stored into the heat storage layer 245. Wherein, the thermal conductivity of the heat conduction layer 246 is equal to or greater than four times of that of the heat storage layer 245. Preferably, the thermal conductivity of the heat conduction layer 246 is equal to or greater than 35 W/(mK), and more preferably, greater than 40 W/(mK). In the current embodiment, the thermal conductivity of the heat conduction layer 246 is between 40.096 and 46.285 W/(mK). Meanwhile, the thermal conductivity of the heat storage layer 245 is preferably equal to or smaller than 8.5 W/(mK), and more preferably smaller than 8.3 W/(mK). In the current embodiment, the thermal conductivity of the heat storage layer 245 is between 1.689 and 8.203 W/(mK).

The second reflection layer 244 includes a second heat reflection surface 244a which is made of metal, and faces the heat storage layer 245 and the chamber 16. The second heat reflection surface 244a could reflect radiation heat back to the chamber 16, and thereby to stop 70% of the heat from dissipating out and could block heat convection as well. When heat storage layer 245 is thermally saturated, the heat dissipates from the heat storage layer 245 would transfer back to the chamber 16 through the heat conduction layer 246, and thereby to provide heat insulation effect for the chamber 16. The thermal conductivity of the second reflection layer 244 is preferably between 0.62 and 0.72 W/(mK). In the current embodiment, the thermal conductivity of the second reflection layer 244 is 0.67 W/(mK).

In addition, the heat conducted from the second reflection layer 244 would be retained in the thermal insulation layer 243. The thermal conductivity of the thermal insulation layer 243 is equal to or smaller than that of the heat storage layer 245. Preferably, the thermal conductivity of the thermal insulation layer 243 is lower than that of the heat storage layer 245. The barrier layer 242 is adapted to insulate the heat convecting from the thermal insulation layer 243 so as to barrier the convection heat and reduce the heat dissipation from thermal insulation layer 243. The thermal conductivity of the barrier layer 242 is greater than that of the thermal insulation layer 243 and smaller than that of the heat storage layer 245. The first reflection layer 241 includes a first heat reflection surface 241a which is made of metal, and faces the thermal insulation layer 243 and the chamber 16. The first heat reflection surface 244a could reflect the heat radiated from the thermal insulation layer 243 back to the chamber 16. Preferably, the heat conductivity of the thermal insulation layer 243 is equal to or smaller than 0.2 W/(mK). In the current embodiment, the heat conductivity of the thermal insulation layer 243 is between 0.04 and 0.16 W/(mK). Preferably, the thermal conductivity of the barrier layer is between 0.4 and 0.6 W/(mK). In the current embodiment, the thermal conductivity of the barrier layer 243 is between 0.483 and 0.551 W/(mK).

A cladding layer 26 could be further disposed on the thermal insulation structure 24, wherein the cladding layer covers the thermal insulation structure 24 and the heat storage member 22, whereby to fix the thermal insulation structure 24 and the heat storage member 22. However, the cladding layer 26 also could be omitted.

In the current embodiment, the first reflection layer 241 and the second reflection layer 244 could be made of aluminum foil, which not only could reflect the radiation heat but also could effectively block the heat source, and further could provide water resistance and moisture resistance. The barrier layer 242 could include refractory material, such as lime. The thermal insulation layer 243 includes organic fiber material (e.g. ceramic fiber, glass fiber, rock wool, etc.) which is filled with air, thereby forming the thermal insulation layer 243 with a thermal conductivity similar to air so as to insulate heat. The heat storage layer 245 could be formed by mixing materials of clay, stone material particles or powder, refractory material, cement, etc. The heat conduction layer 246 could be formed by mixing materials of silicon carbide, magnesium oxide, refractory material, cement, etc.

In practice, except the thermal insulation structure having a multi-layer arrangement as described above, the thermal insulation structure 24 also could have, but is not limited to, other types of arrangement methods which would be illustrated below:

Type (1): at least including the heat conduction layer 246, the heat storage layer 245, and the second reflection layer 244, wherein the heat conduction layer 246 contacts the chamber 16, and the heat storage layer 245 is disposed between the second reflection layer 244 and the heat conduction layer 246;

Type (2): including the arrangement as mentioned in type (1), and further including the first reflection layer 241 and the thermal insulation layer 243 on the second reflection layer 244; alternatively, further including the barrier layer 242 in addition to the first reflection layer 241 and the thermal insulation layer 243, wherein the barrier layer 242 is disposed between the thermal insulation layer 243 and the first reflection layer 241;

Type (3): at least including the first reflection layer 241 and the thermal insulation layer 243, wherein the thermal insulation layer 243 is disposed between the first reflection layer 241 and the chamber 16;

Type (4): in addition to the first reflection layer 241 and the thermal insulation layer 243, further including the barrier layer 242, wherein the barrier layer 242 is disposed between the thermal insulation layer 243 and the first reflection layer 241;

Type (5): in addition to the first reflection layer 241 and the thermal insulation layer 243, further including the heat storage layer 245, wherein the heat storage layer 245 is disposed between the thermal insulation layer 243 and the chamber 16;

Type (6): including the arrangement as mentioned in type (5), and further including the second reflection layer 244, wherein the second reflection layer 244 is disposed between the thermal insulation layer 243 and the heat storage layer 245; alternatively, further including the heat conduction layer 246 in addition to the second reflection layer 244, wherein the heat conduction layer 246 is disposed between the heat storage layer 245 and the chamber 16, and contacts the chamber 16; and Type (7): including the arrangement as mentioned in type (5), further including the heat conduction layer 246, wherein the heat conduction layer 246 contacts the chamber 16, and the heat storage layer 245 is disposed between the heat conduction layer 246 and the thermal insulation layer 243.

In the current embodiment, the thermal insulation structure 24 is utilized in a heater which is the kiln 100 as an example, but it is not limited thereto. The heat insulation structure also could be applied to chambers of other types of heaters, such as an oven, a baking apparatus, a heating apparatus, a thermal insulation apparatus, etc. Wherein, a heat insulation effect could be further achieved if the housing 36 is disposed on the exterior of the insulation structure 24, and an air gap is formed therebetween as described in the current embodiment.

The stove 10 is disposed on a stage 30. In more details, the stove 10 is mounted on the stage 30 via the base 28, which at least includes a carrier plate 282 and a thermal insulation plate 284. In the current embodiment, the base 28 includes two carrier plates 282 which face the cavity 12 and are adapted for placing food ingredients. The thermal insulation plate 284 is disposed under the carrier plate 282 and across a plurality of frames of the stage 30. In practice, the carrier plate 282 could be rock board as an example, and the thermal insulation plates could be rock wool as an example. An air isolation is disposed between the stage 30 and the base 28 for heat insulation. A gas regulation valve is disposed in the stage 30 (not shown), wherein the gas regulation valve includes a knob 32 disposed at a front side of the stage 30 for a user to adjust a flow rate of gas manually. An ignition switch 34 is further disposed at the front side of the stage 30.

The housing 36 is joined to the stage 30 and surrounds the stove 10, wherein an isolation space S2 is formed between the housing 36 and the stove 10. The housing 36 is made of metal such as stainless steel and includes a front plate 362, a rear plate 364, and a cover 366. Wherein, the front plate 362 is joined to the stage 30 and disposed at a front side of the entry 14 of the stove 10; the front plate 362 includes a feeding opening 362a which communicates with the entry 14 and the exhaust channel E formed by the guide plate 182 and the exhaust pipe 20. The front plate 362 and the stove 10 are spaced apart with a distance D1. The rear plate 364 is joined to the stage 30 and is disposed at a rear side of the stove 10. The rear plate 364 and the stove 10 are spaced apart with a distance D2. The cover 366 includes a front edge 366a and a rear edge 366b which are respectively joined to the front plate 362 and the rear plate 364. A through hole 366c is formed on the cover 366 above the front stage 122 of the cavity 12, wherein the through hole 366c is adapted for penetration of the exhaust pipe 20. The cover 366 and the stove 10 are spaced apart with a distance D3. The isolation space S2 consists of the distance D1, D2 and D3 which are respectively formed between the stove 10 and the front plate 362, the rear plate 364, and the cover 366, and the isolation space S2 is adapted to insulate heat and avoid heat dissipating from the stove 10 to the housing 36 directly whereby in designing a compact kiln, the metallic chamber could provide a sufficient support to sustain the thermal insulation structure, which could effectively improve the drawback of being difficult to be scaled down in size corresponding to conventional kilns which are formed by stacking thick stone material. In addition, a flameproof layer 368 could be further disposed on an interior surface of the cover 366 of the cover 366 wherein the flameproof layer 368 is formed by a flameproof coating and adapted to reduce an amount of residual heat dissipated from the stove 10 to the exterior of the cover 366 so as to avoid an over-high temperature on the exterior surface of the cover 366. In the compact size design, the flameproof layer 368 also could prevent the user from being burned by touching the cover 366. Furthermore, the flameproof layer 368 also could be disposed on interior surfaces of the front plate 362 and the rear plate 364, which could reduce the amount of residual heat dissipated from the stove to the housing 36 as well.

The door 38 is adapted to cover at least one portion of the entry 14. The door 38 includes a main plate 382, at least one shield 384, and a blocking plate 386, wherein the main plate 382 is detachably joined to the stove 10 at the entrance 14; the main plate 382 includes a plurality of first vents 382a and a plurality of second vents 382b; the plurality of first vents 382a are laterally arranged at the bottom of the main plate 382; the plurality of second vents 382a are divided into two groups, and each of the two groups is disposed above the plurality of first vents 382a; the second vents 382b of each group are arranged in a circular shape. In the current embodiment, the door 38 includes two shields 384, each of which is movably disposed on an exterior surface of the main plate 382 corresponding to each group of the second vents 382b. Each of the shields 384 includes a plurality of adjusting holes 384a. By turning the shields 384 to close the plurality of second vents 382b or partially shield the plurality of second vents 382b, an air flow passing through the plurality of second vents 382b could be adjusted via the adjusting holes 384a. The blocking plate 386 is joined to an inner edge of the main plate 382, wherein the blocking plate 386 would close the air outlet 164a when the door 38 is at the entry 14. Whereby, the exhaust channel E formed by the air guide structure 18 and the exhaust pipe 20 would be isolated from the interior of the cavity 12.

The combustion device 40 is disposed within the cavity 12 at the rear section 124 and includes at least one burner 42, a supporting assembly 46, and an infrared ray generation assembly 54. In the current embodiment, the combustion device 40 includes a plurality of burners 42, wherein the plurality of burners 42 jointly communicate with a flow divider 44 via a plurality of terminals thereof, and then communicate with a gas regulation valve disposed in the stage 30 through the flow divider 44. A flame outlet 422 is disposed at another terminal of each of the burners 42, and the burners 42 are adapted to burn gas to generate flames through the flame outlets 422. An ignition assembly 56 is disposed beside the burners 42, wherein the ignition assembly 56 is connected to the ignition switch 34 and adapted for igniting gas supplied from the flame outlet 422; the ignition assembly 56 includes an ignitor and a pilot pipeline. An axis i which passes through a corresponding center of each flame outlet 422 is extended along a longitudinal direction of each of the burners 42.

The supporting assembly 46 includes a cover plate 48 which is substantially a bowl shape and disposed above the burners 42. In a vertical direction, the cover plate 48 is located at a position with a height greater than a half of the distance L between the top and the bottom of the middle section of the cavity 12 (as shown in FIG. 5). The cover plate 48 includes at least one hollow area. In the current embodiment, there are a plurality of hollow areas, including an opening 482 and a plurality of holes 484, wherein the opening 482 is corresponding to the flame outlet 422 of each of the burners 42. The infrared ray generation assembly 54 is disposed in the supporting assembly 46, and the cover plate 48 is disposed between the infrared ray generation assembly 45 and the burners 42. In the current embodiment, the infrared ray generation assembly 54 is located above the cover plate 48, such that the flames generated by the burners would pass through the opening 482 to apply on the infrared ray generation assembly 54, which makes the infrared ray generation assembly 54 generate infrared ray. The infrared ray generation assembly 54 includes an emission surface 542a to emit infrared ray which faces the cover plate 48 and is corresponding to the opening 482 and the holes 484, thereby enabling the generated infrared ray to pass through the opening 482 and the holes 484. In practice, the emission surface 542a is at least corresponding to the holes 484. An angle is formed between the emission surface 542a and the axis, wherein the angle is between 100 and 135 degrees. In addition, another function of the cover plate 48 is to maintain a temperature of the infrared ray generation assembly 54 so as to reduce heat dissipation of the infrared ray generation assembly 54.

In the current embodiment, the supporting assembly 46 further includes a supporting plate 50 and another cover plate 52. Wherein, the supporting plate 50 includes a first part 502 and a second part 504; the second part 504 is located above the first part 502, and an obtuse angle is formed between the first part 502 and the second part 504; the first part 502 and the inner wall surface 124a of the rear section 124 are spaced apart with a gap a1, while the second part 504 and the top wall surface of the rear section 124 are spaced apart with a gap a2. The burners 42 are mounted to the first part 502, and said another cover plate 52 is mounted to second part 504 and joined to the cover plate 48, whereby the two cover plates 48, 52 jointly form a containing space S3. The infrared ray generation assembly 54 is disposed in the containing space S3. Said another cover plate 52 also includes a plurality of holes 522, and also could maintain the temperature of the infrared ray generation assembly 54 so as to reduce heat dissipation of the infrared ray generation assembly 54.

The infrared ray generation assembly 54 includes an infrared ray generation mesh 542 and a reflection plate 544. The infrared ray generation mesh 542 includes two surfaces which are opposite to each other, wherein one of the two surfaces is the emission surface 542a, while the other surface is the emission surface 542b which faces a reflection surface 544a of the reflection plate 544. The reflection surface 544a is an arc surface which is concaved toward a direction away from the infrared ray generation mesh 542, whereby the infrared ray emitted by the other emission surface 542b could be centralized and reflected downwardly. The cover plate 48 includes an exterior surface having an arc shape and is protruded outwardly toward a direction away from the infrared ray mesh 542 of the infrared ray generation assembly 54. The cover plate 48 also could generate infrared ray by heating, while the arc-shape exterior surface thereof could increase a range covered by the infrared ray. In the current embodiment, the infrared ray mesh 542 includes a plurality of grids, each of which includes a size smaller than that of each of the holes 484, 522 of the cover plates 48, 52.

The flame outlets 422 of the burners 42 are corresponding to different portions of the infrared ray generation mesh 542 respectively.

The infrared ray generation mesh 542 could be an alloy mesh, such as heat-resistant steel (e.g. FCHW2) mesh, iron-chromium-aluminum alloy mesh, iron-nickel-aluminum alloy mesh, etc. The two cover plates 48, 52 could be made of different stainless steel material. The reflection plate 544 could be made of metal alloys which reflect infrared ray. In practice, the reflection plate 544 also could be omitted.

The infrared ray generation assembly 54 and the cover plate 48 constitute a heating device of the heat source and are adapted to generate heat for heating the cavity 12, which could heat the food ingredients from top down so as to make surfaces of the food ingredients to be heated uniformly.

With the aforementioned structure, a heating method for the kiln 100 according to the present invention includes the following steps.

First, the user adjusts the knob 32 of the gas regulation valve and the ignition switch 34 to control the burners 42 to generate flames. As illustrated in FIG. 7 to FIG. 10, after generating the flames, the infrared ray generation assembly 54 is heated by the flames to generate infrared ray. In the current embodiment, the flames apply to the infrared ray generation mesh 542, which makes the two emission surfaces 542a, 542b to emit infrared ray. Wherein, the infrared ray emitted by the emission surface 542a, which is close to the cover plate 48, irradiates on the carrier plate 282 through the holes 484 of the cover plate 48, thereby providing a larger heating area. Meanwhile, the infrared ray emitted by the emission surface 542b which is close to the reflection plate 544 is reflected to the infrared ray generation mesh 542 by the reflection surface 544a of the reflection plate 544, and irradiates on the carrier plate 282 through the grids of the infrared ray generation mesh 542, and the holes 484 of the cover plate 48 so as to increase an intensity of the infrared ray irradiated on the carrier plate 282. Since the angle formed between the axis i of the burners and the emission surfaces 542a, 542b of the infrared ray generation mesh 542 is between 100 and 135 degrees, the flames could be uniformly acted on the emission surfaces 542a, 542b of the infrared ray generation mesh 542, which achieves an optimal performance for the infrared ray emission. The flames generated by the burners 42 also apply on the cover plate 48 to make the cover plate 48 to generate infrared ray, and thereby to increase the intensity of the infrared ray irradiated on the carrier plate 282.

The temperature of the infrared ray generation assembly 54 is maintained to be between 900 and 100° C., and the infrared ray generation assembly 54 is blocked by the cover plate 48, which enables the infrared ray having an optimum range of infrared ray wavelength to pass through the holes 484 of the cover plate 48. Preferably, a wavelength range is between 4 to 8 μm, which could provide a better transmission efficiency for the heated food ingredients on the carrier plate 282 so as to heat an interior of the food ingredients. A temperature on the exterior surface of the cover plate 48, i.e., the surface which faces toward a direction away from the infrared ray generation assembly 54, is between 600 and 800° C.

The flames generated by the burners 42 penetrates upwardly through the holes 484, 522 of the two cover plates 48, 52 to form an open fire at the top of the middle section 126. The open fire is adapted to heat the surface of the food ingredients, such as scorching the surface of the food ingredients to form golden color. Whereby, the combustion device 40 could have a larger heating area so as to achieve a uniform heating and increase a heating efficiency.

Since coke is formed on the infrared ray generation assembly 54 when gas burns, and an over-heated steam is generated from the steam formed by burning the gas, a reaction to generate water-gas which includes hydrogen and carbon monoxide would occur when the over-heated steam passes through the hot coke having a temperature between 900 and 1100° C. on the infrared ray generation assembly 54, which provides an auxiliary fuel to the gas burning.

For example, water-gas is generated when the steam passes the high-temperature coke according to equation 1:

$$C + H_2O \rightarrow H_2 + CO - 113.4 \text{ KJ} \qquad (1)$$

Wherein, the generation heat equals to −113.4 KJ, which represents that equation 1 is an endothermic reaction. However, the generated hydrogen and carbon monoxide would react with the steam formed in the combustion according to equation 2, which is an exothermic reaction.

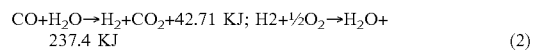

$$CO + H_2O \rightarrow H_2 + CO_2 + 42.71 \text{ KJ}; \; H_2 + \tfrac{1}{2}O_2 \rightarrow H_2O + 237.4 \text{ KJ} \qquad (2)$$

A total generation heat of equation 2 equals to 280.11 KJ. An overall reaction heat of equation 1 and equation 2, which subtracts 113.4 KJ from 280.11 KJ, would be 166.71 KJ. It could be understood that the generation of the water-gas when the over-heated steam passes through the coke on the infrared ray generation assembly 54 could increase a heating efficiency, whereby a consumption of gas could be reduced. The advantage of placing the infrared ray generation assembly 54 between the two cover plates 48, 52 is that the temperature of the infrared ray generation assembly 54 could be kept between 900 and 1000° C. which is necessary for generating the water-gas under a limited amount of gas consumption by utilizing the cover plates 48, 52 to maintain the temperature of the infrared ray generation assembly 54. Meanwhile, the cover plates 48, 52 are concaved toward a direction away from the infrared ray generation assembly 54, which enables part of the heat to be concentrated and reflected back to the infrared ray generation assembly 54, thereby providing a better performance in maintaining the temperature. In contrast, simply utilizing the cover plate 48 also could maintain the temperature of the infrared ray generation assembly 54 between 900 and 100° C., but the gas consumption thereof would be higher than that of the examples of utilizing the two cover plates 48, 52.

A temperature of the overheated steam is about 300° C. and higher, wherein water molecules would become smaller water vapor which could penetrate food and dissolve fat at high temperature to increase a heating efficiency of cooking food ingredients, whereby the over-heated steam also could be adapted to heat food ingredients. Moreover, the water vapor generated from the food ingredients also would be heated to form over-heated vapor so as to further increase the heating efficiency.

The burners 40 creates a high-temperature zone at a higher position to make the hot air flow formed by combustion, i.e., the hot air flow formed by the heat generated from the heating assembly of the heat source, be guided downwardly by the wall surface of the top of the front section 122 of the cavity 12, which facilitates the hot air flowing back to the burners 42 and reduces heat dissipation. Meanwhile, external air would be drawn in from the entry 14 as combustion-supporting air together with the flowing-back of the hot air flow. By mixing the external air with the hot air flow which flows back, a temperature of the air flowing back to the burners 42 could be increased to avoid cold air directly flowing back to the burners 42, whereby heat dissipation could be reduced so as to increase heat efficiency. Moreover, the thermal insulation structure 24 covers the chamber 16, which could maintain the temperature inside of the cavity 12, prevent heat dissipating from the combustion device 40 through the chamber 16, and thereby to keep the temperature of the infrared ray assembly 54 between 900 and 1100° C. and reduce the gas consumption. The heat storage member 22 would absorb part of the heat from the top of the front section 122 of the cavity 12, which makes the temperature at the top of the front section 122 be lower than the temperature at the top of the middle section 126 so as to drive the hot air to flow downwardly whereby, the flowing back of the hot air could be increased, and the heating effect improved. Moreover, it is also favorable to keep the temperature of the infrared ray generation assembly 54 between 900 and 1100° C. and reduce the gas consumption.

With the heating method as described above, the food ingredients in the chamber could be heated sufficiently, and the gas consumption could be reduced as well.

Furthermore, a retained air flow could be generated in the gap a1 and the gap a2, which are respectively formed between the first part 502 of the supporting plate 50 and the inner wall surface 124a at the rear section 124 of the cavity 12, and between the second part 504 of the supporting plate 50 and the top wall surface at the rear section 124 of the cavity 12, to pull the hot air flow, which flows back, to move upwardly again, and thereby to make a circulation effect of the hot air flow in the cavity 12 become better.

In addition, redundant hot air flow would be exhausted from the outlet 164a to the outside through the air guide structure 18 and the exhaust pipe 20. During the exhaust process, cold air would be drawn in from the outside via the feeding opening 362a of the front plate 362 and the entry 14, and then be pulled up to the air guide structure 18 and the exhaust pipe 20 through the air outlet 164a so as to lower a temperature of the front plate 362 and a temperature of the exhaust pipe 20, thereby avoiding the user to be burned by the front plate 362 and the exhaust pipe 20. Since the heat storage member 22 contacts the air guide structure 18, part of the heat of the heat storage member 22 would be transferred to the air guide structure 18 to heat the exhaust channel E, which results in rising of steam as an upward pulling force to speed up an exhaust rate of the hot air flow, and thereby to increase the exhaust efficiency and improve the circulation effect of the hot air flow in the cavity. The guide plate 182 which tilts upwardly is also favorable to increase air guide performance such that the exhaust efficiency could be further improved. Meanwhile, the increase in the exhaust rate of the hot air flow also would increase the speed of cold air drawing into the air guide structure 18, which could make the temperature of the front plate 362 and the exhaust pipe 20 become lower. The exhaust pipe 20 is located at the top of the front section 122 of the cavity 12, which could make the exhaust path shorter, whereby the air flow could be exhausted out faster.

Figure 11:
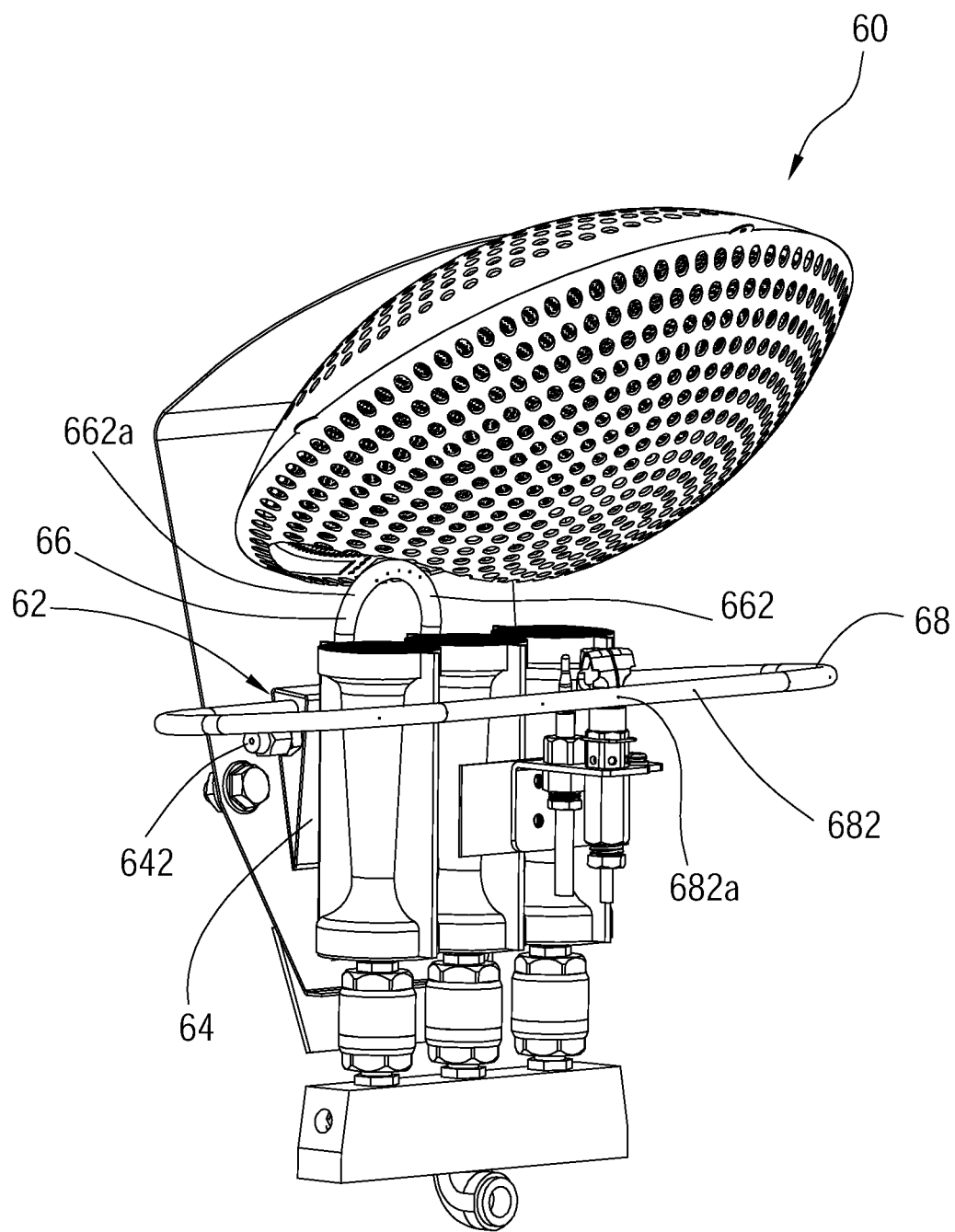
FIG. 11 is a perspective view of a combustion device of a second embodiment according to the present invention.
Figure 12:
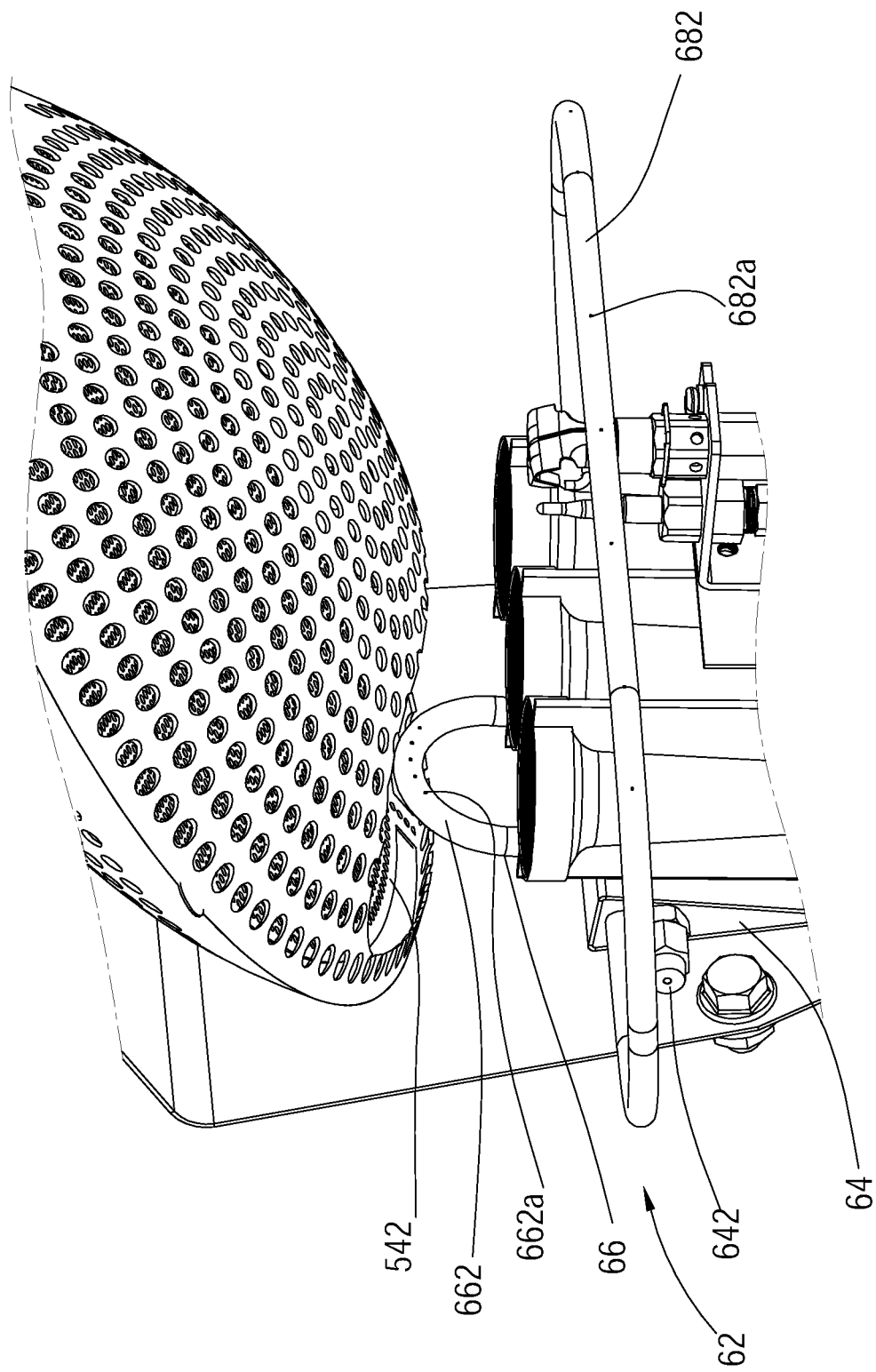
FIG. 12 is a partial perspective view of the combustion device of the second embodiment.

A combustion device 60 of a second embodiment according to the present invention is illustrated in FIG. 11 and FIG. 12. The combustion device 60 of the second embodiment includes a basic structure similar to the combustion device 40 of the first embodiment, and further includes a steam generation assembly 62, which is adapted to generate steam to be used as an over-heated steam for combustion. The steam generation assembly 62 includes a steam source which is a water tank 64 as an example, a first pipe 66, and a second pipe 68. Wherein, the water tank 64 is disposed at one side of the burners 42. In more details, the water tank 64 is mounted on the first part 502 of the supporting plate 50, and is located between the first part 502 and the burners 42. The water tank 64 includes a water inlet 642 for filling water. The first pipe 66 is connected to a top of the water tank 64, and two terminals of the first pipe 66 communicate with an interior of the water tank 64. A section 662 of the first pipe 66 includes a plurality of spraying holes 662a. In practice, there could be only one spraying hole 662a, and the section 662 is located between the flame outlet 422 of the burners 42 and the reflection surface 542a of the infrared ray generation assembly 54. Two terminals of the second pipe 68 are respectively connected to two sides of the water tank 64 and communicate with the interior of the water tank 64. The second pipe 68 surrounds the burners 42, and a section 682 of the second pipe 68 is located below the exterior surface of the cover plate 48. The burners 42 are located between the section 682 of the second pipe 68 and the water tank 64. The section 682 includes a plurality of spraying holes 682a which face toward the front section 122 of the cavity 12. In practice, there could be only one spraying hole 682a.

After heating of the water contained in the water tank 64 of the steam generation assembly 62, the water becomes steam which would spray out from the spraying holes 662a of the first pipe 66, wherein the steam could be either guided to the infrared ray generation mesh 542 by the first pipe 66 to be used as the over-heated steam for forming the water-gas, or be used as the over-heated steam for heating the food ingredients. The steam which sprays out from the spraying holes 682a of the second pipe 68 is mainly used as the over-heated steam for heating the food ingredients, however, also could be used as the over-heated steam for forming the water-gas.

With the steam generated from the steam generation assembly 62 as the source of the over-heated steam, the heating efficiency could be improved efficiently. In practice, the steam generation assembly 62 could only include the first pipe 66 or the second pipe 68. On the other hand, the steam source also could be disposed outside of the cavity 12, and the first pipe 66 and the second pipe 68 could be directly connected to the steam source.

Figure 13:
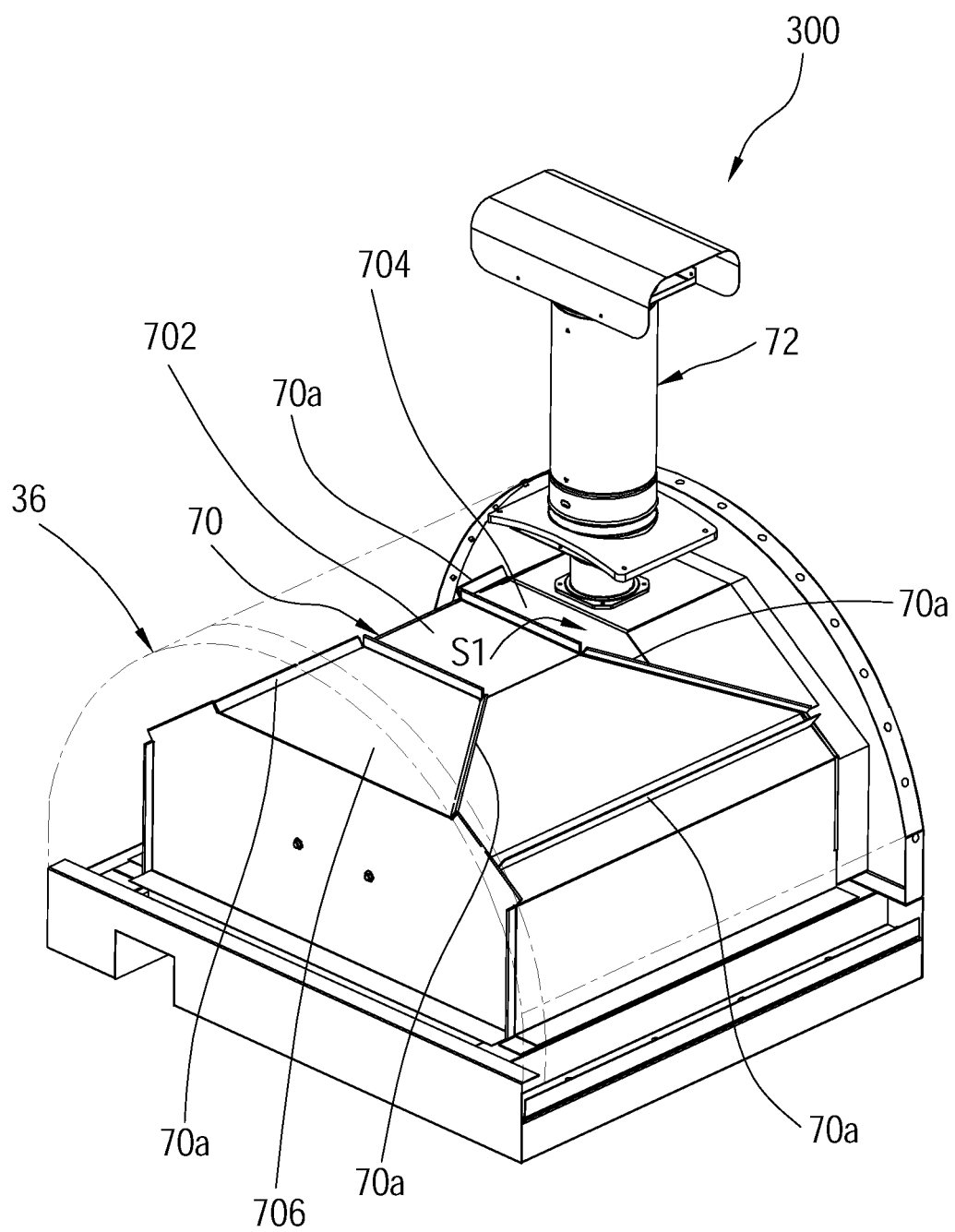
FIG. 13 is a perspective view of a kiln of a third embodiment according to the present invention, wherein a thermal insulation structure and a heat conductive structure are omitted.
Figure 14:
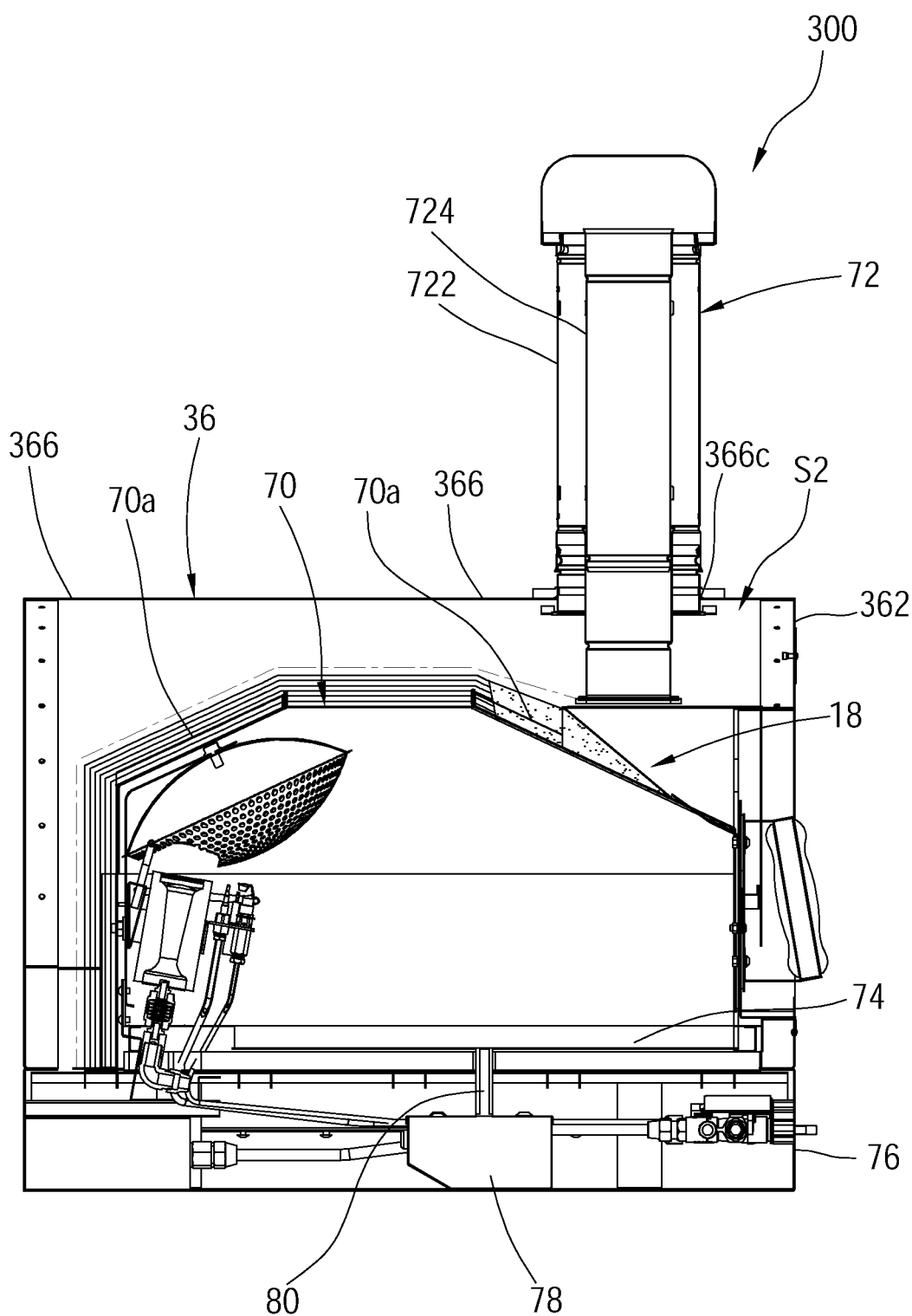
FIG. 14 is a cross-sectional view of the kiln of the third embodiment.

As illustrated in FIG. 13 and FIG. 14, a kiln 300 of a third embodiment according to the present invention includes a structure which is similar to that of the first embodiment, wherein the kiln 300 of the third embodiment is different from that of the first embodiment in that in the current embodiment, a first inclined plate 704, and a second inclined plate 706 of a chamber 70 are respectively joined to a main body 702 of the chamber 70 with edges of the main body 702, the first inclined plate 704, and the second inclined plate 706, which are to be joined, being bent in advance, which forms a plurality of ridges 70a. The ridges 70a could reinforce the strength of the chamber 70 and avoid the heat storage member 22 or the thermal insulation structure 24 from sliding down effectively. For example, part of the heat storage member 22 which is outside of the space S1 is surrounded by the plurality of ridges 70a at the periphery of the first inclined plate 704, thereby avoiding the heat storage member 22 from sliding down from the first inclined plate 704. Meanwhile, the ridges 70a at other positions of the chamber 70 could prevent the thermal insulation structure 24 from sliding down, which reinforces the joined strength of the chamber 70 and the thermal insulation structure 24.

In the current embodiment, an exhaust pipe 72 includes an outer pipe 722 and an inner pipe 724, wherein one end of the outer pipe 722 is connected to the housing 36, and the outer pipe 722 is adapted to communicate the isolation space S2 inside of the housing 36 with an outside of the cover 366; the inner pipe 724 penetrates through the through hole 366c, and the inner pipe 366 is adapted to communicate the air guide structure 18 with the outside of the cover 18. Whereby, the redundant hot air in the isolation space S2 could be exhausted out through the outer pipe 722 so as to reduce heat dissipation from the isolation space S2 to the housing 36 and lower the temperature of the front plate 362. The configuration of the outer pipe 722 and the inner pipe 724 of the exhaust pipe according to the current embodiment also could be utilized in the first embodiment.

In addition, a carrier plate 74 of the current embodiment is a disc shape and is rotatably disposed on the bottom of the chamber 70. In more details, a driving motor 78 is further disposed on a stage 76. The driving motor 78 is connected to the carrier plate 74 via a rotation member 80 to drive the carrier plate 74 to rotate. Whereby, the food ingredients disposed on the carrier plate 74 could be uniformly heated. The rotatable design of the carrier plate 74 of the current embodiment also could be utilized in the first embodiment.

Figure 15:
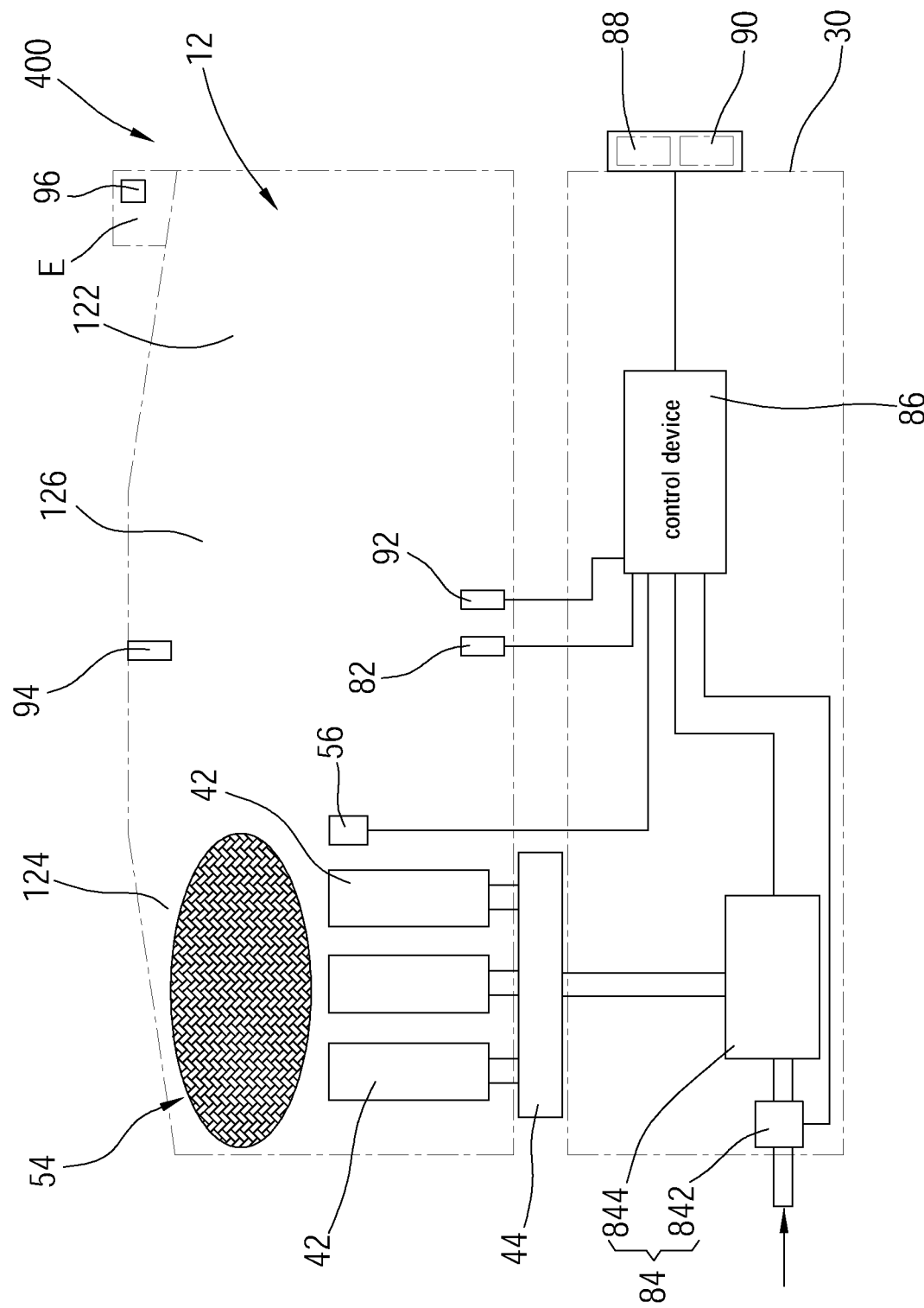
FIG. 15 is a schematic view of a kiln of a fourth embodiment.

As illustrated in FIG. 15, a kiln 400 of a fourth embodiment according to the present invention includes a structure which is similar to that of the first embodiment. The kiln 400 of the current embodiment is different from that of the first embodiment in that the gas regulation valve provided in the first embodiment is adapted for the user to adjust the gas flow rate of the burners 42 manually, but a control system is provided in the current embodiment to replace the manual adjustment instead. In the current embodiment, the control system of the kiln 400 includes a thermometer 82, a flow rate regulation device 84, and a control device 86, wherein the flow rate regulation device 84 and the control device 86 are disposed in the stage 30, which would be described in detail as follows.

The thermometer 82 is disposed in the cavity 12 to detect the temperature inside of the cavity 12. In the current embodiment, the thermometer 82 is located at the middle section 126 of the cavity 12. However, the thermometer 82 also could be disposed at the front section 122 of the cavity 12.

The flow rate regulation device 84 communicates with at least one of the burners 42, and a flow rate regulation valve 844 is controlled to adjust a gas flow of the at least one burner 42. In the current embodiment, the flow rate regulation device 84 includes a channel valve 842 and a flow rate regulation valve 844, wherein one end of the channel valve 842 is connected to the gas source; one end of the flow rate regulation valve 844 is connected to the channel valve 842, and another end of the flow rate regulation valve 844 communicates with the burners 42. The channel valve 842 could be controlled to close or open so as to shut or pass the gas. The flow rate regulation valve 844 could be controlled to regulate the gas flow to be transported to the burners 42.

The control device 86 is electrically connected to the thermometer 82, and the channel valve 842 and the flow rate regulation valve 844 of the flow rate regulation device 84. The control device 86 is also electrically connected to the ignition assembly 56, an input unit 88, and a display unit 90, wherein the input unit 88 is adapted for the user to input an ignition command, and a setting temperature; the display unit 90 is adapted to display a message.

After inputting the ignition command via the input unit 88 by the user, the control device 86 would control the ignition assembly 56 to ignite and the channel valve 842 to open so as to ignite the gas of the burners 42. Then, the control device would control the flow rate regulation valve 844 of the flow rate regulation device 84 to adjust the outputted gas flow based on the inputted setting temperature and the temperature of the cavity which is detected by the thermometer 82, and thereby to maintain the temperature inside of the cavity at a constant temperature range corresponding to the setting temperature. Whereby, an automatic temperature control could be realized.

In order to fulfill the object of infrared ray heating, the infrared ray generation assembly 54 of the combustion device 40 would generate infrared rays of a predetermined wavelength range which irradiate toward the middle section 126 and the front section 122 of the cavity 12 when the gas flow output from the flow rate regulation device 84 is above a predetermined flow rate. The predetermined wavelength range is between 4 and 9 μm. When the temperature detected by the thermometer 82 is between the constant temperature range or higher than an upper limit of the constant temperature range, the control device 86 would control the flow rate regulation valve 844 of the flow rate regulation device 84 to make the gas flow output from the flow rate regulation valve 844 be equal to or higher than the predetermined flow rate. Whereby, in addition to keep the cavity 12 at a constant temperature, the infrared ray generation assembly 54 also could generate infrared ray for heating food ingredients. If a maximum gas flow rate is determined as the gas flow output from the regulation device 84 when the regulation device 84 is being controlled, the predetermined flow rate is preferably equal to or higher than one-third of the maximum gas flow rate.

In the current embodiment, the kiln 400 further includes an infrared ray detector 92, a flame sensor 94, and a carbon monoxide detector 96 which are electrically connected to the control device 86 respectively. Wherein, the infrared ray detector 92 is disposed at the bottom of the middle section 126 of the cavity 12, and adapted to detect the infrared ray emitted by the combustion device 40. When the wavelength of the infrared ray detected by infrared ray detector 92 is between the predetermined wavelength range, the control device 86 would control the display 90 to display a prompt message (e.g. a light signal or a text message) to remind the user that the infrared ray suitable for penetrating food ingredients is already generated by the combustion device 40. Of course, the infrared ray detector 92 also could be disposed at the front section 122 of the cavity 12.

The flame detector 94 is disposed at the top of the middle section 126 of the cavity, and is higher than the infrared ray generation assembly 54. When a flame is detected by the flame detector 94, the control device 86 would control the display unit 90 to display a prompt message to remind the user that an open fire is already generated and could be used to heat the food ingredients.

The carbon monoxide detector 96 is disposed in the exhaust channel E, and adapted to detect a concentration of carbon monoxide in the air flow passing through the exhaust channel E. When the concentration of the carbon monoxide detected by the carbon monoxide detector 96 is higher than a predetermined value, the control device 86 would control the channel valve 842 of the flow rate regulation device 84 to shun the gas whereby, it is favorable to avoid the concentration of the carbon monoxide contained in the exhausted gas from becoming too high to harm the human body.

Figure 16:
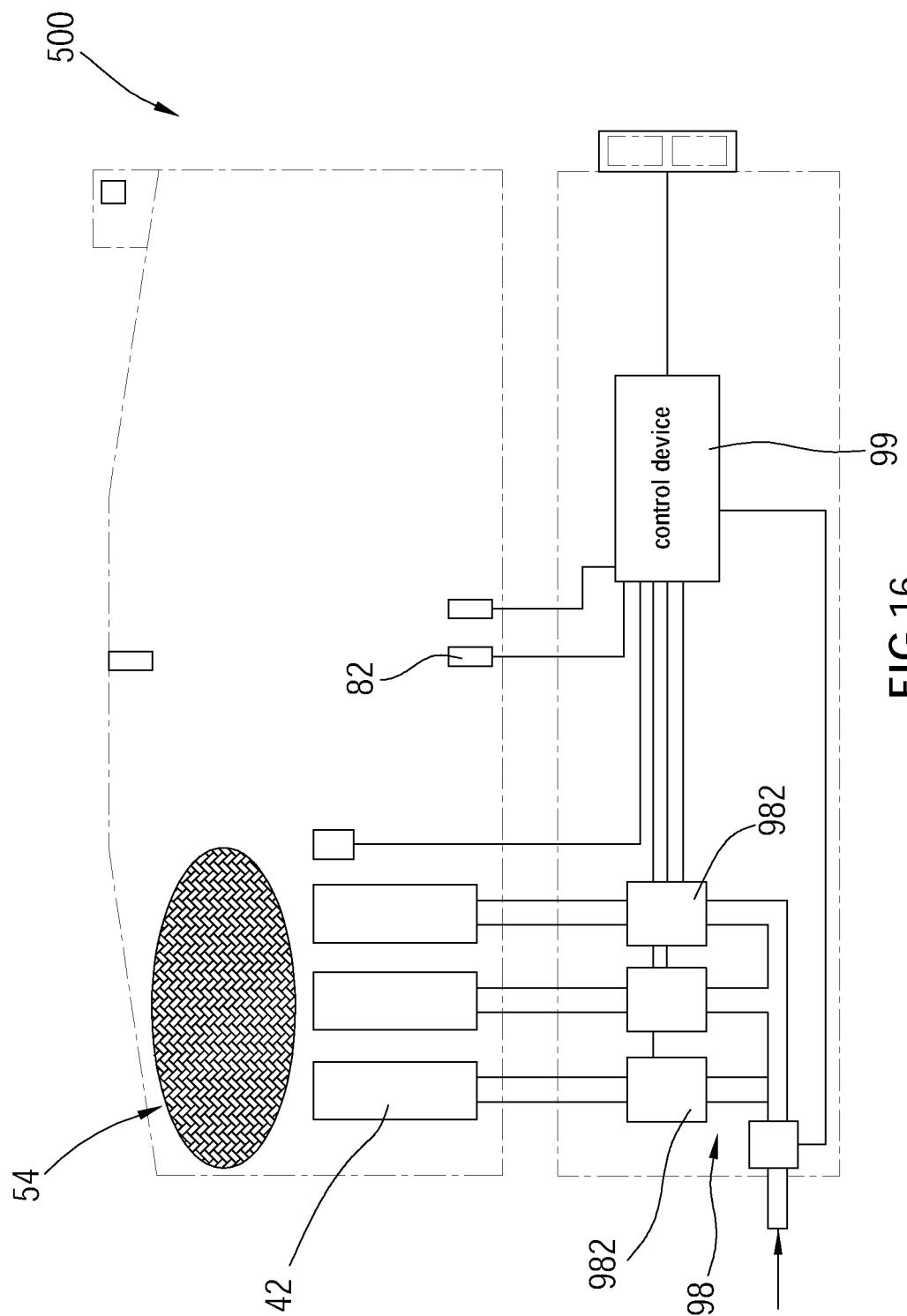
FIG. 16 is a schematic view of a kiln of a fifth embodiment according to the present invention.

As illustrated in FIG. 16, a kiln 500 of a fifth embodiment according to the present invention includes a structure which is similar to that of the fourth embodiment. Wherein, the kiln 500 of the fifth embodiment is different from that of the fourth embodiment in that a flow rate regulation device 98 of the current embodiment includes a plurality of gas switch valve 982, which are electrically connected to a control device 99. The plurality of gas switch valves 982 communicate with the burners 42 respectively, and could be controlled by the control device 99 to close or open respectively, and thereby to adjust the gas flow output to the burners 42. When all of the gas switch valves are open, a gas flow output to the burners 42 is a maximum gas flow rate; when only one of the gas switch valves 982 is turned on, the gas flow output from the flow rate regulation device 98 is the predetermined flow rate which enables the combustion device 40 to generate the infrared ray of the predetermined wavelength range. When the temperature detected by the thermometer 82 is between the constant temperature range or higher than the upper limit of the constant temperature range, the control device 99 would control at least one of the gas switch valves 982 to open, whereby the infrared ray generation assembly 54 could be maintained at the temperature which enables the combustion device 40 to generate the infrared ray of the predetermined wavelength range.

In the current embodiment, when the temperature detected by the thermometer 82 is between the constant temperature range or higher than the upper limit of the constant temperature range, the control device 99 would control the gas switch valves 982 to open by turns so as to make the burners 42 generate flames sequentially. For example, if only the first gas switch valve 982 is turned on, the second gas switch valve 982 would be turned on after a period of time and then the first gas switch valve 982 would be turned off; the third gas switch valve 982 would be turned on after another period of time, and the second gas switch valve 982 would be turned off; thereafter, the first gas switch valve 982 would be turned on again, and the third gas switch valve 982 would be turned off. In this way, the burners 42 could generate flames by turns to heat different portions of the infrared ray generation assembly 54, and thereby avoid the flames from applying on a single position, which would result in degradation and premature damage to the infrared ray generation assembly 54. The control systems of the fourth and the fifth embodiments also could be utilized in the second and the third embodiments.

As mentioned above, with the structural design of the combustion device and the stove, the kiln of the present invention is conducive to increase of the heating efficiency and shorten a cooking time of the food ingredients. In addition, the combustion device and the thermal insulation structure of the present invention are not limited to be applied to kilns, and could be utilized in other heating apparatus. The aforementioned combustion devices are not limitations to the kilns of the first, the second, and the third embodiments. In particular, the kilns also could include firewood, fire rows disposed in the cavity, or an electrothermic heat source, and preferably the kilns could include a heat source which is capable of generating infrared ray.

It must be pointed out that the embodiments described above are only some embodiments of the present invention. All equivalent structures which employ the concepts disclosed in this specification and the appended claims should fall within the scope of the present invention.

What is claimed is:

1. A kiln, comprising:
   a stove, including a cavity, an entry, and an air outlet, wherein the cavity includes a front section, a middle section, and a rear section; the front section communicates with the entry; the middle section is disposed between the front section and the rear section; the rear section is away from the entry; a top wall surface of the front section tilts downwardly toward the entry; a top wall surface of the rear section tilts downwardly from the middle section toward a direction away from the entry; the air outlet is located between a top of the front section and the entry;
   a heat source, disposed in the rear section of the cavity and including a heating assembly adapted to generate heat for heating the cavity, wherein the heating assembly is located at a position which is higher than a half of a distance between a top and a bottom of the middle section of the cavity; and
   an exhaust pipe, wherein the stove includes a chamber, an air guide structure, and a heat storage member; an interior of the chamber forms the cavity, and the chamber includes the entry and the air outlet; the air guide structure is disposed at the top of the front section of the cavity, and the air guide structure communicates with the air outlet; the exhaust pipe is located above the air guide structure; the heat storage member covers an exterior of the cavity which is corresponding to the top of the front section of the cavity, and contacts the air guide structure;
   wherein the stove includes a thermal insulation structure; the thermal insulation structure covers an exterior of the cavity which is corresponding to the rear section and the middle section so as to make a temperature of the middle section is higher than that of the front section;
   wherein the thermal insulation structure includes a heat conduction layer, a heat storage layer, and a reflection layer; the heat conduction layer contacts the cavity; the heat conduction layer is disposed between the reflection layer and the heat conduction layer; a thermal conductivity of the heat conduction layer is greater than that of the heat storage layer;
   wherein the thermal insulation structure further includes another reflection layer and a thermal insulation layer; the thermal insulation layer is disposed between the reflection layer and said another reflection layer; a thermal conductivity of the thermal insulation layer is equal to or smaller than that of the heat storage layer;
   wherein the thermal insulation structure further includes a barrier layer which is disposed between the thermal insulation layer and said another reflection layer.

2. The kiln of claim 1, wherein the air guide structure comprises a guide plate, which tilts upwardly from the air outlet toward a direction away from the entry; the guide plate and the exhaust pipe constitute an exhaust channel; the heat storage member contacts an exterior of the air guide plate.

3. The kiln of claim 2, wherein the heat storage member includes a plurality of stacked particles.

4. The kiln of claim 3, wherein the air guide structure comprises a lid plate which is joined to the chamber and the guide plate; a space is enclosed by the lid plate, the guide plate and the chamber; at least one portion of the heat storage member is disposed in the space.

5. The kiln of claim 1, further comprising a door, wherein the door includes a main plate and a blocking plate; the main plate is detachably joined to the stove at the entry; the blocking plate is adapted to close the air outlet.

6. The kiln of claim 5, wherein the door further including a shied; the main plate includes a plurality of vents; the shield is movably disposed on the main plate and adapted to close at least a portion of the vents.

7. A kiln, comprising:
   a stove, including a cavity, an entry, and an air outlet, wherein the cavity includes a front section, a middle section, and a rear section; the front section communicates with the entry; the middle section is disposed between the front section and the rear section; the rear section is away from the entry; a top wall surface of the front section tilts downwardly toward the entry; a top wall surface of the rear section tilts downwardly from the middle section toward a direction away from the entry; the air outlet is located between a top of the front section and the entry; and a heat source, disposed in the rear section of the cavity and including a heating assembly adapted to generate heat for heating the cavity, wherein the heating assembly is located at a position which is higher than a half of a distance between a top and a bottom of the middle section of the cavity;

wherein the heat source is a combustion device which includes at least one burner, a supporting assembly, and an infrared ray generation assembly; the at least one burner includes a flame outlet; flames are generated from the flame outlet by burning gas via the at least one burner; the at least one burner is defined with an axis which passes through a corresponding center of the flame outlet; the supporting assembly includes a cover plate which is disposed above the at least one burner and includes at least one hollow portion; the infrared ray generation assembly is mounted to the supporting assembly and is located above the cover plate; the infrared ray generation assembly is heated by the flames generated by the at least one burner to generate infrared ray; the infrared ray generation assembly includes an emission surface which is corresponding to the at least one hollow portion and adapted to emit the infrared ray; an angle is formed between the emission surface and the axis, and the angle is between 100 and 135 degrees; the heating assembly includes the cover plate and the infrared ray generation assembly.

8. The kiln of claim 7, wherein the cover plate is protruded outwardly toward a direction away from the infrared ray generation assembly; the cover plate includes a plurality of the hollow portions, including a plurality of holes and an opening, wherein the flames generated from the flame outlet pass through the opening and apply on the infrared ray generation assembly, and the emission surface is corresponding to the plurality of holes.

9. The kiln of claim 7, wherein the supporting assembly includes another cover plate which is joined to the cover plate, and the two cover plates jointly form a containing space therebetween; the infrared ray generation assembly is disposed in the containing space.

10. The kiln of claim 9, wherein said another cover plate includes a plurality of holes.

11. The kiln of claim 9, wherein the supporting assembly includes a supporting plate having a first part and a second part disposed above the first part; the at least one burner is mounted on the first part, and said another cover plate is mounted on the second part; the rear section of the stove includes an inner wall surface which faces the entry, and the top wall surface of the rear section tilts upwardly toward a direction away from the inner wall surface; the first part and the inner wall surface are spaced apart with a gap; the second part and the top wall surface of the rear section are spaced apart with another gap.

12. The kiln of claim 7, wherein the infrared ray generation assembly includes an infrared ray generation mesh, and a surface of the infrared ray generation mesh is the emission surface.

13. The kiln of claim 12, wherein the infrared ray generation assembly includes a reflection plate having a reflection surface; the infrared ray generation mesh includes another emission surface which is opposite to the reflection surface, while the emission surface of the infrared ray generation mesh faces the reflection surface; the reflection surface is concaved toward a direction away from the infrared ray generation mesh.

* * * * *